United States Patent [19]
Kashima

[11] Patent Number: 5,291,340
[45] Date of Patent: Mar. 1, 1994

[54] REFLECTING OBJECTIVE SYSTEM

[75] Inventor: Shingo Kashima, Tokyo, Japan

[73] Assignee: Olympus Optical Co., Ltd., Tokyo, Japan

[21] Appl. No.: 937,128

[22] Filed: Aug. 31, 1992

Related U.S. Application Data

[62] Division of Ser. No. 553,639, Jul. 18, 1990, Pat. No. 5,144,496.

[30] Foreign Application Priority Data

| Jul. 19, 1989 | [JP] | Japan | 1-184561 |
| Jul. 19, 1989 | [JP] | Japan | 1-184562 |
| Jul. 27, 1989 | [JP] | Japan | 1-192747 |
| Jul. 27, 1989 | [JP] | Japan | 1-192748 |

[51] Int. Cl.$^5$ .................. G02B 17/06; G02B 21/04
[52] U.S. Cl. .................................................. 359/859
[58] Field of Search ............ 359/859, 858, 366, 729, 359/731

[56] References Cited

U.S. PATENT DOCUMENTS

| 2,306,679 | 12/1942 | Warmisham | 350/620 |
| 3,527,526 | 9/1970 | Silvertooth | 359,620 |
| 3,584,937 | 6/1971 | Nishimoto | 359/859 |
| 4,624,538 | 11/1986 | MacFarlane | 350/620 |
| 4,733,955 | 3/1988 | Cook | 350/620 |
| 4,863,253 | 9/1989 | Shafer et al. | 359/366 |
| 4,964,706 | 10/1990 | Cook | 350/620 |
| 4,993,818 | 2/1991 | Cook | 350/505 |

FOREIGN PATENT DOCUMENTS

| 47-12508 | 4/1972 | Japan . | |
| 47-24833 | 10/1972 | Japan . | |
| 55-105217 | 8/1980 | Japan | 350/620 |
| 59-77403 | 5/1984 | Japan . | |
| 59-124311 | 7/1984 | Japan . | |
| 275453 | 4/1970 | U.S.S.R. | 359/858 |
| 275453 | 7/1970 | U.S.S.R. | 350/620 |

OTHER PUBLICATIONS

V. A. Panov et al, "Microobjectives with Two Ellipsoidal Reflecting Surfaces", Soviet Journal of Optical Technology, vol. 37, No. 11, Nov. 1970, pp. 721–725.
D. R. Shafer, "Laser beam expander . . . ", SPIE, vol. 190, LASL Optics Conf. (1979) pp. 15–20.
J. H. Oberheuser, "Optical system . . . ", SPIE, Proc. Soc. Photo-Opt. Instrum. Eng. (USA) vol. 193 (1979, pp. 27–33.
A. K. Head, "The Two-Mirror Aplanat", Proc. of the Physical Soc. (London), vol. 70 No. 545B (Oct. 1957), pp. 945–949.

Primary Examiner—Jon W. Henry
Attorney, Agent, or Firm—Cushman, Darby & Cushman

[57] ABSTRACT

A reflecting objective system comprising three or more spherical reflecting mirrors arranged symmetrically with regard to an optical axis common thereto and has spherical aberration corrected very favorably. By using a single or plural aspherical surfaces, this reflecting objective system can be modified so as to comprise two or more reflecting mirrors and correct not only the spherical aberration but also the offaxial aberrations.

3 Claims, 28 Drawing Sheets

REFLECTING OBJECTIVE SYSTEM

This application is a division of application Ser. No. 07/553,639, filed Jul. 18, 1990, now U.S. Pat. No. 5,144,496.

BACKGROUND OF THE INVENTION a) Field of the Invention

The present invention relates to a reflecting objective system suited for use as an objective system for microscopes and the similar optical instruments.

b) Description of the Prior Art

Unlike the ordinary refraction type objective lens systems, the reflecting objective systems have a common characteristic that they produce no chromatic aberration. Owing to this characteristic, the reflecting objective systems have long since been used as objective systems for telescopes, microscopes and the similar optical instruments. Further, reflecting objective systems are also used in certain cases where it is impossible to obtain materials which are suited for manufacturing lenses of refraction type optical systems to be used at certain wavelengths.

As the conventional reflecting objective systems, there are known the optical systems disclosed by Japanese Patent Kokoku Publication No. Sho 47-12508, Japanese Patent Kokai Publication No. Sho 47-24833, Japanese Patent Kokai Publication No. Sho 59-77403 and Japanese Patent Kokai Publication No. Sho 59-124311.

Out of these optical systems, the reflecting objective system disclosed by Japanese Patent Kokoku Publication No. Sho 47-12508 comprises a combination of two spherical reflecting mirrors and a planar reflecting mirror, and is adapted so as to form an image of object by reflecting light four times on the three reflecting surfaces. It can hardly be said that this reflecting objective system is suited for practical use since optical powers are not distributed adequately among the reflecting surfaces and not only the offaxial aberrations but also the axial aberration is not corrected sufficiently.

Further, each of the reflecting objective systems disclosed by Japanese Patent Kokai Publication No. Sho 47-24833, Japanese Patent Kokai Publication No. Sho 59-77403 and Japanese Patent Kokai Publication No. Sho 59-124311 comprises two reflecting surfaces at least one of which is designed as an aspherical surface, and has the axial aberration corrected relatively favorably by the effect of the aspherical surface. However, the offaxial aberrations are not corrected sufficiently in these reflecting objective systems, thereby making it impossible to obtain large field numbers. These systems are of course usable as objective systems when field numbers not so large are allowable for practical use. However, there remains a problem that these reflecting objective systems are not practically usable with ease since it is very difficult to manufacture aspherical surfaces with high precision even when reflecting objective systems have high design performance.

SUMMARY OF THE INVENTION

A primary object of the present invention is to provide a reflecting objective system in which aberrations are corrected favorably even when said objective system comprises only spherical surfaces.

Another object of the present invention is to provide a reflecting objective system in which not only the axial aberration but also the offaxial aberrations are corrected favorably.

A further object of the present invention is to provide various types of reflecting objective systems which have magnifications ranging from a low level to a high level.

A first type of the reflecting objective system according to the present invention comprises, in the travelling order of the light incident from the object side, a first spherical reflecting mirror, a second spherical reflecting mirror and a third spherical reflecting mirror which are arranged symmetrically with regard to an optical axis common thereto, said first and second spherical reflecting mirror having positive optical powers, whereas said third spherical reflecting mirror having a negative optical power.

A second type of the reflecting objective system according to the present invention comprises, in the travelling order of the light incident from the object side, a first spherical reflecting mirror, a second spherical reflecting mirror, a third spherical reflecting mirror and a fourth spherical reflecting mirror which are arranged symmetrically with regard to an optical axis common thereto, said first spherical reflecting mirror having a positive optical power, said fourth spherical reflecting mirror having a negative optical power, and said second and third spherical reflecting mirrors having positive or negative optical powers.

A third type of the reflecting objective system according to the present invention comprises, in the travelling order of the light incident from the object side, a first reflecting mirror having a positive optical power and a second reflecting mirror having a negative optical power, these reflecting mirrors being arranged on an optical axis common thereto and having aspherical surfaces, and the aspherical surface of said second reflecting mirror having such a shape as to strengthen the negative optical power from the optical axis toward the marginal portion thereof.

The third type of the reflecting objective system according to the present invention can have a modified composition wherein additional reflecting mirrors are arranged between said first reflecting mirror and said second reflecting mirror so that the light reflected on the first reflecting mirror is reflected by the additional reflecting mirrors and then incident on the second reflecting mirror.

A fourth type of the reflecting objective system according to the present invention comprises, in the travelling order of the light incident from the object side, a first reflecting mirror having a positive optical power, a second and a third reflecting mirrors at least one of which has a positive optical power, and a fourth reflecting mirror having a negative optical power, the total optical power of said first through third reflecting mirrors having a positive value, and at least one of the surfaces of the first, second, third and fourth reflecting mirrors being designed as an aspherial surface.

Now, the reflecting objective system according to the present invention will be described more detailedly below:

FIG. 1 shows the fundamental composition of the first type of the reflecting objective system according to the present invention. This type of reflecting objective system has a composition wherein the light coming from a specimen surface is reflected four times by the first spherical mirror $M_1$, the second spherical mirror $M_2$, the first spherical mirror $M_1$ and the third spherical mirror $M_3$ in this order, and then is led to an imaging point through an aperture formed at the center of the first spherical mirror $M_1$.

In a reflecting objective system comprising two reflecting surfaces having optical powers, the first reflecting mirror for receiving the light coming from the object has a positive optical power and the second reflecting mirror for receiving the light reflected by the first reflecting mirror has a negative optical power so that the negative spherical aberration produced by the first reflecting mirror is cancelled by the second reflecting mirror. In such a reflecting objective system comprising the two reflecting surfaces, however, the negative optical power is stronger than the positive optical power, and the spherical aberration cannot be cancelled completely between these two spherical surfaces.

In view of this fact, the fist type of the reflecting objective system according to the present invention comprises an additional spherical mirror having a positive optical power to correct the spherical aberration favorably.

In the first type of the reflecting objective system according to the present invention, the first reflecting mirror is used only for correcting the spherical aberration and gives nearly no influence on the paraxial design values. Magnification, for example, of the reflecting objective system is determined by the ratio between the radius of curvature of the second reflecting mirror and that of the third reflecting mirror as well as the optical distance between the second reflecting mirror and the third reflecting mirror. The reflecting objective system according to the present invention is designed so as to satisfy the following condition (1):

$$(1) \quad 7 \leq |r_2/r_3| \times (f/L_{23}) \leq 9 \tag{1}$$

wherein the reference symbol f represents the focal length of the reflecting objective system, the reference symbol $L_{23}$ designates the optical distance between the second reflecting mirror and the third reflecting mirror which is given, in the case of the first type of reflecting objective system, as $L_{23} \approx |d_2| + |d_3|$ as shown in FIG. 1, and the reference symbols $r_2$ and $r_3$ denote radii of curvature of the second reflecting mirror and the third reflecting mirror respectively. The distance between the reflecting mirrors is given as the distance as measured on the optical axis between the vertices of the reflecting surfaces.

If the lower limit of the condition (1) is exceeded, the total optical power of the second reflecting mirror and the third reflecting mirror will be too weak, and the positive optical power of the first reflecting mirror will be also weakened for compensation, thereby resulting in undercorrection of the spherical aberration. If the upper limit of the condition (1) is exceeded, in contrast, the total optical power of the second reflecting mirror and the third reflecting mirror will be too strong, and the positive optical power of the first reflecting mirror will be strengthened for compensation, thereby resulting in overcorrection of the spherical aberration.

Since the paraxial design values are determined almost by the second reflecting mirror and the third reflecting mirror, and the first reflecting mirror is used only for correcting the spherical aberration as described above, the first reflecting mirror has a very weak optical power, which becomes further weaker as the reflecting objective system has a shorter focal length (higher magnification). It is therefore desirable that the first reflecting mirror satisfies the following condition (2):

$$(2) \quad 0.02 \leq |2/r_1| \cdot (L_{23}^2/f) \leq 0.3 \tag{2}$$

wherein the reference symbol $r_1$ represents radius of curvature on the first reflecting mirror.

If the lower limit of the condition (2) is exceeded, the first reflecting mirror will have too weak an optical power, thereby undercorrecting the aspherical aberration. If the upper limit of the condition (2) is exceeded, in contrast, the fist reflecting mirror will have too strong an optical power, thereby overcorrecting the spherical aberration.

Now, description will be made on the second type of the reflecting optical system according to the present invention. FIG. 2 illustrates the fundamental composition of the second type, wherein the light coming from a specimen is reflected by a first reflecting mirror $M_1$, a second reflecting mirror $M_2$, a third reflecting mirror $M_3$ and a fourth reflecting mirror $M_4$ in this order, and then led to an imaging point. The second type of the reflecting objective system is adapted so as to favorably correct the spherical aberration by designing the first reflecting mirror and the fourth reflecting mirror so as to have a positive optical power and a negative optical power respectively, and equipping the second and third reflecting mirrors mainly with roles to correct the aspherical aberration.

The paraxial design values (magnification, focal length, image point, etc.) of the second type of the reflecting objective system are determined by the ratio of powers between the first reflecting mirror on which the light coming from the specimen falls first and the fourth reflecting mirror on which said light is incident finally, and the second reflecting mirror and the third reflecting mirror have roles to increase the z component of the direction cosine of the light incident on the fourth reflecting mirror (the z axis in this case is coincident with the optical axis) and correct the spherical aberration. For this reason, it is necessary that the optical power of each of the second and third reflecting mirrors has an absolute value smaller than that of the optical power of the first reflecting mirror or the fourth reflecting mirror. That is to say, it is desirable that the second type of the reflecting objective system satisfies the following conditions (3) and (4):

$$|\phi_2| \leq 0.2 \tag{3}$$

$$|\phi_3| \leq 0.2 \tag{4}$$

wherein the reference symbols $\phi_2$ and $\phi_3$ represent the values expressed as $\phi_2 = f \cdot (2/r_2)$ and $\phi_3 = f \cdot (2/r_3)$ respectively, the reference symbol f designates the focal length of the reflecting objective system, and the reference symbols $r_2$ and $r_3$ denote radii of curvature on the second reflecting mirror and the third reflecting mirror respectively.

If $\phi_2$ or $\phi_3$ does not satisfy the condition (3) or (4), the second reflecting mirror or the third reflecting mirror will have too strong an optical power, thereby overcorrecting the spherical aberration.

When the third reflecting mirror is brought close to the first reflecting mirror, the ray having a small numerical aperture (hereinafter abbreviated NA becomes low on the third reflecting mirror and the marginal ray reflected by the fourth reflecting mirror is apt to be vignetted by the third reflecting mirror or the shielded ratio is enhanced. "Shielded ratio" means a ratio between the area of a circle shielded at the center of an objective mirror irradiated with the light bundle coming from a specimen and that of a circle determined by the outside diameter of a ring-shaped aperture of said objective mirror, or given as $(NA_{max}/NA^{min})^2$ wherein $NA_{max}$ and $NA_{min}$ represent the maximum NA and the minimum NA respectively of the light bundle incident on said objective mirror. In order to lower this shielded ratio, the third reflecting mirror must be located farther from the first reflecting mirror. In a case where the reflecting objective system has a low magnification, i.e., a long focal length, however, the first reflecting mirror tends to be located near the first reflecting mirror, contrary to the purpose to lower the shielded ratio.

Further, in case where the reflecting objective system has a high magnification, i.e., a short focal length, the third reflecting mirror tends to be located near the second reflecting surface, and the reflecting objective system has a high shielded ratio when the third reflecting mirror is too close to the second reflecting mirror. It is therefore necessary that the location of the third reflecting mirror is selected within a certain range which is determined dependently on magnification (i.e., focal length) and NA determined dependently thereon. This range is defined by the following condition (5):

$$0.01 \leq (|\Delta M_{13}| \cdot f)/L_0^2 \leq 0.1 \quad (5)$$

wherein the reference symbol $|\Delta M_{13}|$ represents the distance as measured on the optical axis between the first reflecting mirror and the third reflecting mirror, and the reference symbol $L_{01}$ designates the optical distance as measured from the specimen to the first reflecting mirror.

Now, description will be made on the third type of the reflecting objective system according to the present invention. The fundamental composition of this reflecting objective system is illustrated in FIG. 3, wherein the light coming from a specimen surface is reflected by a first reflecting mirror $M_1$ and a second reflecting mirror $M_2$, and led to an imaging point.

Both the reflecting surfaces of these reflecting mirrors are designed as aspherical surfaces. Spherical aberration can be corrected more favorably in the reflecting objective system as a whole by designing the second reflecting mirror, out of these two reflecting mirrors, so as to have an aspherical surface having a shape which strengthens the optical power thereof from the optical axis toward the marginal portion thereof so that the surface produces an increased amount of positive spherical aberration. The shape of the aspherical surface adopted for the second reflecting mirror of the reflecting objective system of the present invention is illustrated in FIG. 54. The curvature of the second reflecting mirror is higher than the actual curvature on the aspherical surface. Reference symbol M represents the aspherical surface of the second reflecting mirror and the symbol $R_s$ designates the spherical surface that is in contact, on the optical axis, with the aspherical surface of the second reflecting mirror. As is shown in FIG. 54, the surface of the second reflecting mirror used in the reflecting objective system of the present invention is designed as an aspherical surface having a radius of curvature that becomes shorter as the surface portions become farther from the optical axis. That is, the aspherical surface has a shape such that the negative refractive power is strengthened as the surface portions become farther from the optical axis. This aspherical surface can correct the axial aberration favorably but cannot correct the offaxial aberrations. In order to correct the offaxial aberrations, the third type of the reflecting objective system adopts the first reflecting mirror having the aspherical surface which functions to correct coma while balancing it with the axial aberration.

Let us use a total sum of optical path length differences OPD's as a variable which represents the effect of the aspherical surfaces as a whole.

The total sum of OPD's is obtained by determining the difference between the optical path length of the reflecting objective system comprising the first aspherical reflecting mirror and that of the objective system comprising the reference sphere of the first aspherical reflecting mirror, the difference between the optical path length of the reflecting objective system comprising the second aspherical reflecting mirror and that of the objective system comprising the reference sphere of the second aspherical reflecting mirror, normalizing the values of the differences to the height of the axial marginal ray incident on the aspherical mirrors respectively, and totalizing the normalized values.

First, let us represent the departure from the reference sphere normalized to the height of ray by:

$$\delta Z_A / h_A = \delta$$

wherein the reference symbol $h_A$ represents height of the axial marginal ray on the aspherical surface and the reference symbol $\Delta Z_A$ designates the departure measured along the optical axis from the reference sphere to a point on the aspherical surface having the height of ray $h_A$.

When the z components of the direction cosine of the rays incident and emerging respectively from the point on the aspherical surface having the height of ray $h_A$ are represented by n and n' respectively, we obtain from FIG. 5:

$$PP_A = \Delta Z_A, \; P_A P_h = h_A, \; \cos\theta = n \text{ and } -\cos\theta' = n'$$

In addition, the reference symbol $S_A$ represents the aspherical surface and the reference symbol S designates the reference sphere in FIG. 5.

From FIG. 5, the value of OPD is approximated as follows:

$$OPD \approx (P_i P_A + P_A P_r)/h_A \approx \delta \cos\theta + \delta \cos\theta'$$

The formula mentioned above permits determining a total sum of optical path length differences $\Sigma OPD$ normalized to all the heights of rays. This value should be normalized to the longitudinal magnification since it is considered that the value is nearly proportional to the longitudinal magnification. However, taking into consideration a case where the reflecting objective system is designed so as to have an image point located at infinite distance, the optical path length differences are normalized to $(f/L_{01}^2)$ wherein the reference symbol f represents focal length of the reflecting objective system and the reference symbol $L_{01}$ designates the optical distance as measured from the specimen surface to the first reflecting mirror.

In order to favorably correct both the axial and offaxial aberrations, it is necessary that ΣOPD has a value satisfying the following condition (6):

$$0.5 \times 10^{-5} \leq \Sigma OPD \times (f/L_{01}^2) \leq 1.5 \times 10^{-4} \quad (6)$$

If the lower limit of the condition (6) is exceeded, the aspherical surface will produce spherical aberration of an insufficient value, thereby allowing spherical aberration to remain. If the upper limit of the condition (6) is exceeded, in contrast, coma will be overcorrected, thereby degrading the offaxial performance.

In order to correct coma by the first reflecting mirror while balancing it with spherical aberration in the reflecting objective system according to the present invention, it is desirable that the reflecting objective system satisfies the following condition (7):

$$1 \times 10^{-5} \leq |\Delta Z_{A1}/h_{A1}| \leq 5 \times 10^{-3} \quad (7)$$

If the lower limit of the condition (7) is exceeded, the aspherical surface of the first reflecting mirror will have a too low function for correcting aberration or lose its effect as an aspherical surface. If the upper limit of the condition (7) is exceeded, in contrast, the first reflecting mirror will produce too remarkable aberration or degrade the balance between the axial and offaxial aberrations, thereby making it difficult to correct the aberrations favorably in the reflecting objective system as a whole.

The aspherical surface adopted for the second reflecting mirror is used mainly for correcting the spherical aberration and has a departure from the reference sphere thereof which is larger than that of the aspherical surface of the first reflecting mirror.

It is desirable that the aspherical surface of the second reflecting mirror satisfies the following condition (8):

$$1 \times 10^{-4} \leq |\Delta Z_{A2}/h_{A2}| \leq 3 \times 10^{-2} \quad (8)$$

If the lower limit of the condition (8) is exceeded, the aspherical surface will have too low an aberration correcting function, thereby undercorrecting the spherical aberration. If the upper limit of the condition (8) is exceeded, the second reflecting mirror will produce too remarkable aberrations, thereby making it difficult to correct the aberrations favorably in the reflecting objective system as a whole.

The tendencies described with reference to the above-mentioned conditions (6), (7) and (8) are more remarkable as the reflecting objective system has a higher magnification. For the reflecting objective system having a high magnification, it is therefore desirable that the first reflecting mirror has an aspherical surface designed on the basis of a nearly spherical surface satisfying the following condition (9) and that the second reflecting mirror has an aspherical surface designed on the basis of an elliptic surface of revolution which has a minor axis located on the optical axis and satisfies the following condition (10)

$$e \leq 0.15 \quad (9)$$

$$e \geq 0.5 \quad (10)$$

wherein the reference symbol e represents the eccentricity of the surface used as the basis of the aspherical surface.

Further, the shapes of the aspherical surfaces are expressed by the following formula:

$$z = \frac{c'h^2}{1 + \sqrt{1 - (1+k)c'^2 h^2}} + Ah^4 + Bh^6 + c'h^8 + Dh^{10}$$

wherein the reference symbol z represents the distance as measured along the optical axis from the vertex of the aspherical surface to a point on the aspherical surface, the reference symbol c designates the radius of curvature on the reference sphere of the aspherical surface of interest, the reference symbol h denotes the distance as measured in the direction perpendicular to the optical axis from the optical axis to a point on the aspherical surface, the reference symbol k represents the conical coefficient, and the reference symbols A, B, C and D designate the aspherical surface coefficients of the fourth, sixth, eighth and tenth orders respectively. Further, the relationship between k and e is as expressed below:

$$k = -e^2 \quad (k \leq 0)$$

$$k = e^2/(1-e^2) \quad (k > 0)$$

If the condition (9) is not satisfied, the departure from the reference sphere determined by eccentricity, i.e., the conical coefficient will have a large value and it will be difficult to satisfy the condition (7) even by varying values of the aspherical surface coefficients, whereby the aspherical surface will over-correct the aberrations or aggravate both spherical aberration and coma.

If the condition (10) is not satisfied, the departure from the reference sphere determined by eccentricity, i.e., the conical coefficient will have too small a value and it will be difficult to satisfy the condition (8) even by varying values of the aspherical surface coefficients, thereby resulting in undercorrection of the spherical aberration.

Though it is possible to correct the aberrations by using the so-called purely conical surface of revolution such as an elliptic surface of revolution or a hyperbolic surface of revolution as in Embodiment 15 to be described later, the aberrations can be corrected more favorably by using the aspherical surface including the terms of high orders. This tendency is more remarkable as the reflecting objective system has a higher magnification.

A reflecting objective system having a low magnification requires a wide airspace between the first reflecting mirror and the second reflecting mirror, and tends to have a long total length. In order to shorten the mechanical length of the lens barrel to a desired value, it is sufficient to arrange a turn-back mirror, as in the optical system disclosed by Japanese Patent Kokoku Publication No. Sho 47-12508.

Now, description will be made on the fourth type of the reflecting objective system according to the present invention.

Unlike the refraction type objective lens system, the reflecting objective system comprising two reflecting mirrors tends to have a Petzval's sum of a large negative value since the first reflecting mirror and the second reflecting mirror have optical powers prettily different from each other, and especially the second reflecting mirror has a strong negative optical power. This tendency is more remarkable as the reflecting objective system has a higher magnification.

Since the Petzval's sum which represents curvature of the image surface is a total sum of the optical powers of the reflecting surfaces, it is impossible on principle to reduce the Petzval's sum of the reflecting objective system comprising the two reflecting surfaces, or correct the curvature of the image surface.

The fourth type of the reflecting objective system according to the present invention has the composition illustrated in FIG. 4, wherein first reflecting mirror $M_1$ through a fourth reflecting mirror $M_4$, which have at least three reflecting surfaces having optical powers out of the four reflecting surfaces, are arranged in the travelling order of the incident light in such a manner that the light coming from a specimen is reflected by the first through the third reflecting mirrors and then incident on the fourth reflecting mirror corresponding to the second reflecting mirror in the reflecting objective system comprising the two reflecting mirrors.

Further, the negative optical power of the fourth reflecting mirror is weakened by increasing the z component of the direction cosine of the light incident on the fourth reflecting mirror so that the Petzval's sum of the reflecting objective system is reduced to prevent the image surface therein to be curved. For this reason, the fourth reflecting mirror of the fourth type of the reflecting objective system is designed so as to have an optical power $\phi_4$ satisfying the following condition (11):

$$|\phi_4| \leq 0.1 \tag{11}$$

wherein $\phi_4$ is defined as $\phi_4 \leq f \cdot (2/r_4)$, the reference symbol f represents the focal length of the reflecting objective system as a whole and the reference symbol $r_4$ designates the radius of curvature on the fourth reflecting mirror.

If the condition (11) is not satisfied, the fourth reflecting mirror will have too strong an optical power and the image surface will be curved to such a degree that cannot be corrected by the first through the third reflecting mirrors, thereby allowing curvature of field to remain in the reflecting objective system as a whole.

Furthermore, since the axial design values (magnification, focal length, image point, etc.) are determined by the ratio between the optical power of the first reflecting mirror on which the light coming from the object (specimen) is incident first and that of the fourth reflecting mirror on which said light is incident finally, the second reflecting mirror and the third reflecting mirror are used mainly for increasing the z component of the direction cosine of the light incident on the fourth reflecting mirror, and for correcting spherical aberration and coma. For this reason, the optical power of each of the second reflecting mirror and the third reflecting mirror has an absolute value which is smaller than that of the optical power of the first reflecting mirror or that of the fourth reflecting mirror. When the third reflecting mirror is close to the first reflecting mirror, the ray having a small NA becomes low on the third reflecting mirror, whereby the marginal ray reflected by the fourth reflecting mirror is apt to be vignetted by the third reflecting mirror or the shielded ratio is enhanced. In order to lower the shielded ratio, the third reflecting mirror must be located farther from the first reflecting mirror. In a case where the reflecting objective system has a low magnification or a long focal length, however, the third reflecting mirror tends to be located near the first reflecting mirror, contrary to the purpose to lower the shielded ratio. In a case where the reflecting objective system has a high magnification or a short focal length, the third reflecting mirror tends to be located near the second reflecting mirror and, when the third reflecting mirror is too close to the second reflecting mirror, the shielded ratio is enhanced.

For the reason described above, it is necessary to select the location of the third reflecting mirror within a certain range delimited by the magnification (focal length) of the reflecting objective system and the NA determined dependently thereon, or the range defined by the following condition (12):

$$0.01 \leq (|\Delta M_{13}| \cdot f)/L_{01}^2 \leq 0.1 \tag{12}$$

wherein the reference symbol $\Delta M_{13}$ represents the distance as measured on the optical axis from the first reflecting mirror to the third reflecting mirror, and the reference symbol $L_{01}$ designates the optical distance as measured from the specimen to be observed through the reflecting objective system to the first reflecting mirror.

DETAILED DESCRIPTION OF THE PREFERRED EMBODIMENTS

Figure 1:
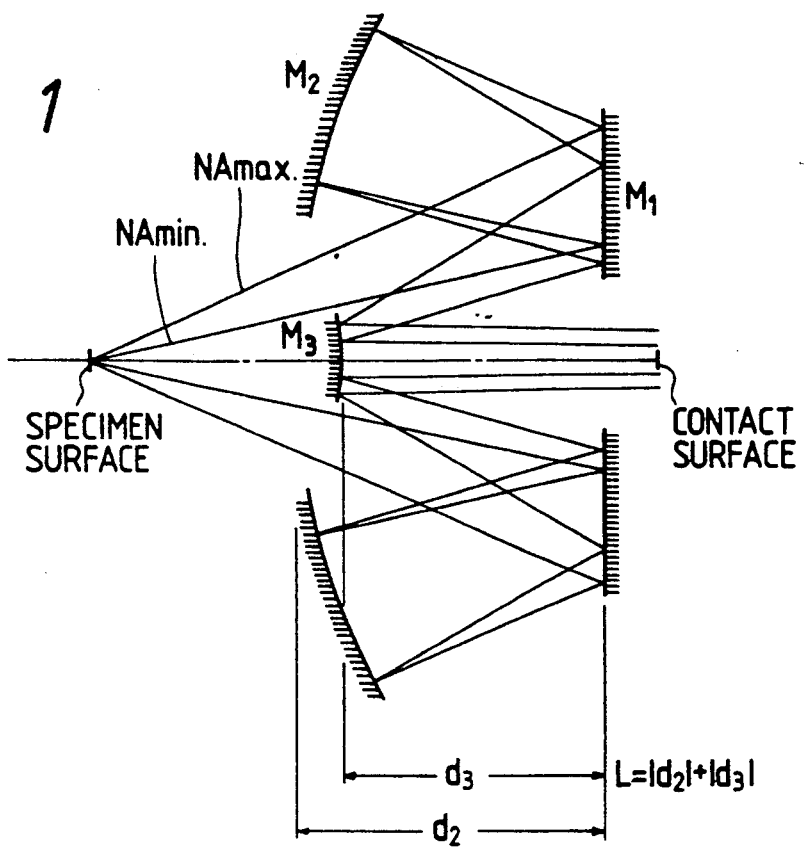
FIG. 1 through FIG. 4 show sectional views illustrating the fundamental compositions of the first through fourth types of the reflecting objective system according to the present invention.
Figure 2:
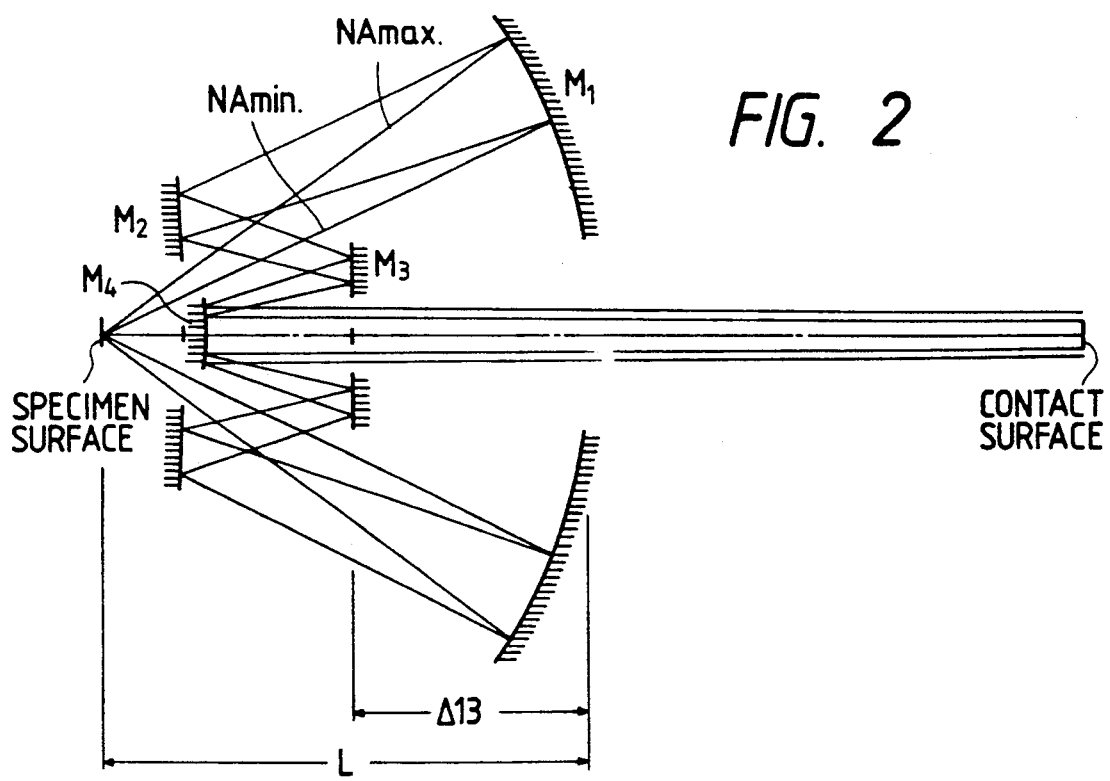
Figure 3:
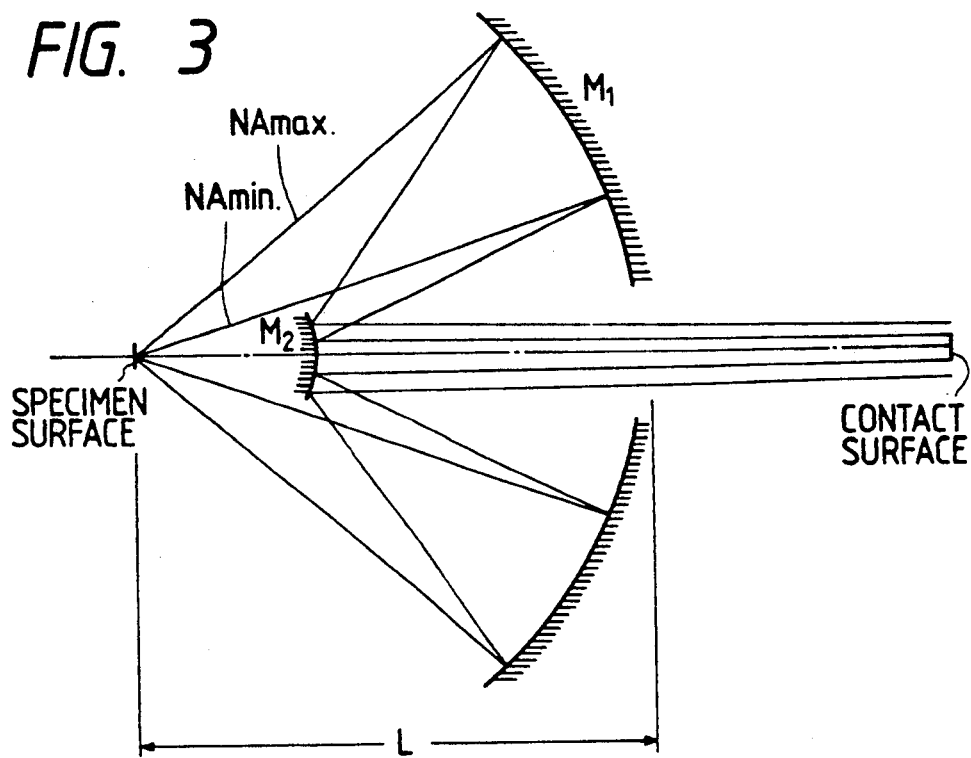
Figure 5:
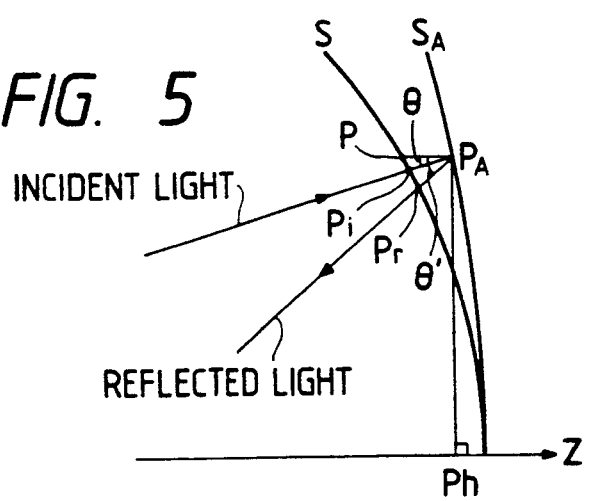
FIG. 5 shows a schematic sectional view illustrating lights incident and reflected on an aspherical surface.
Figure 4:
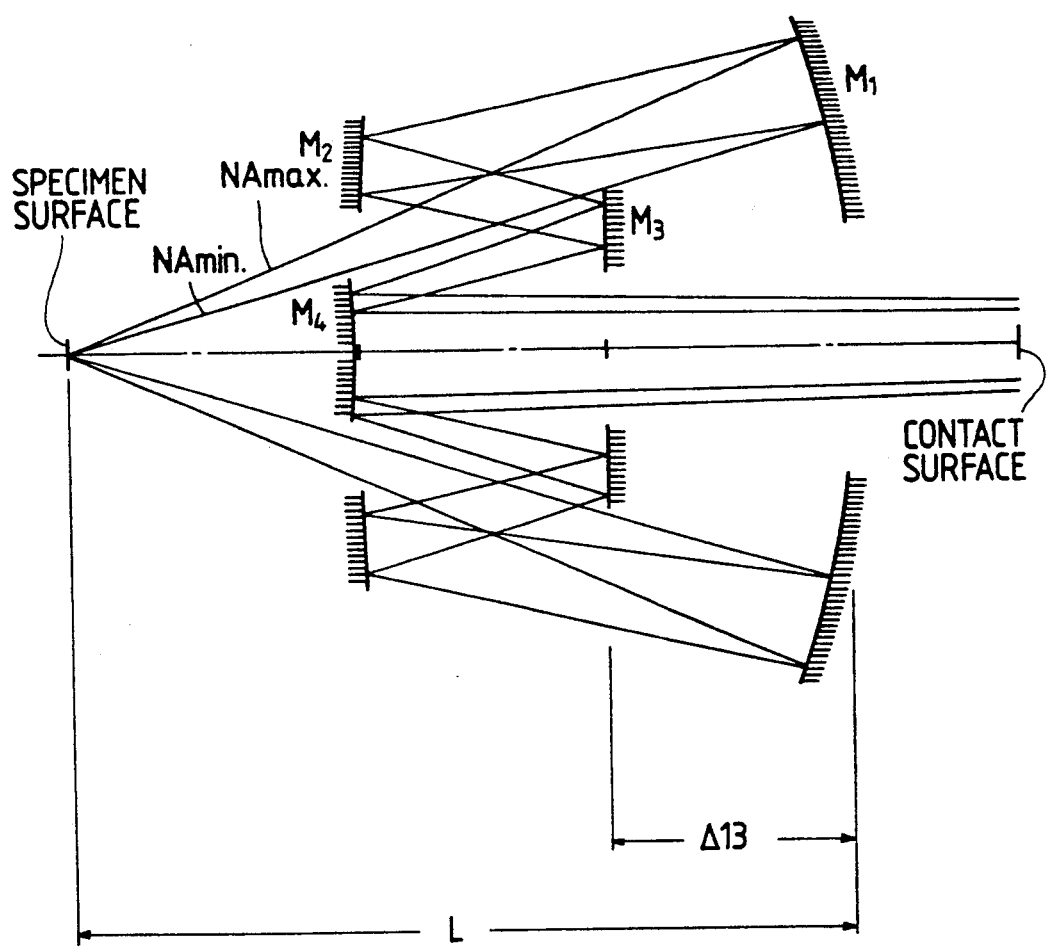
Figure 6:
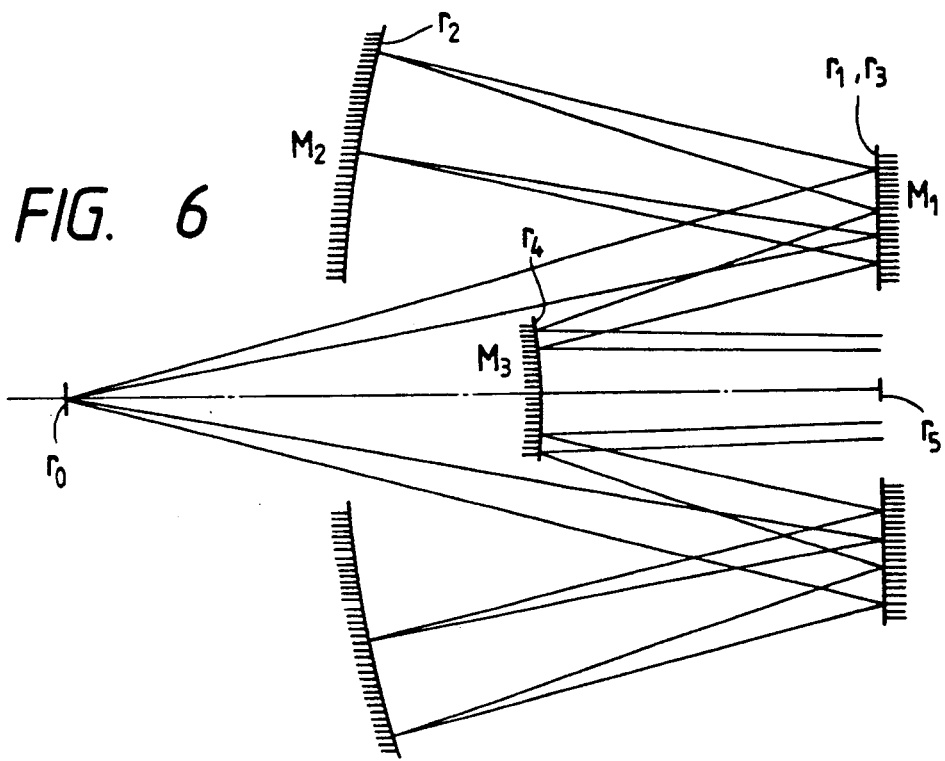
FIG. 6 through FIG. 29 show sectional views illustrating compositions of Embodiments 1 through 24 of the reflecting objective system according to the present invention.
Figure 7:
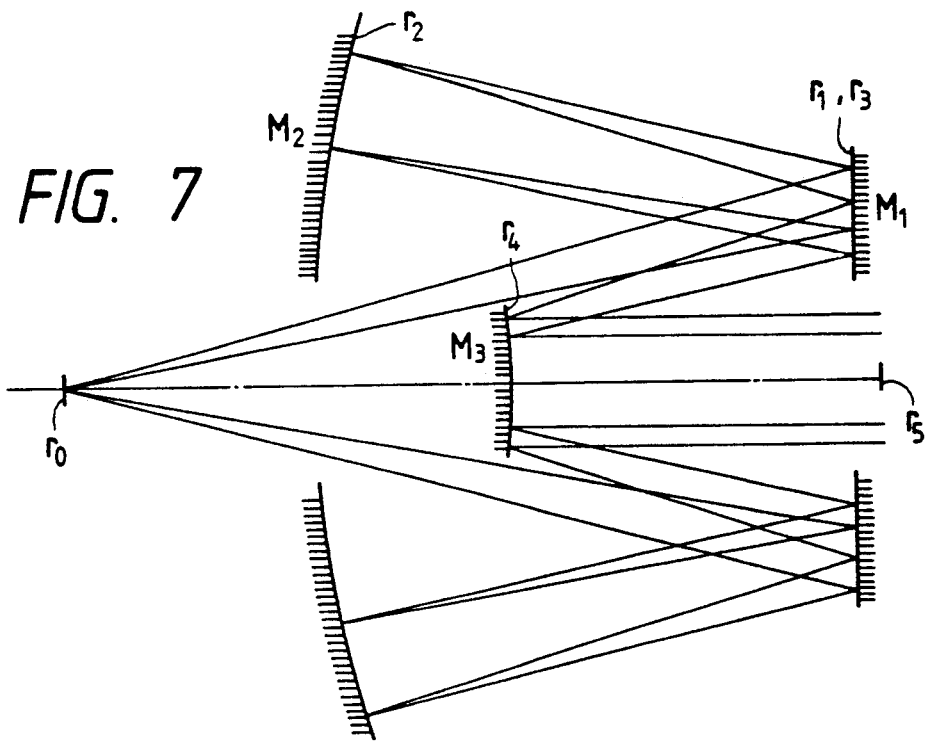
Figure 8:
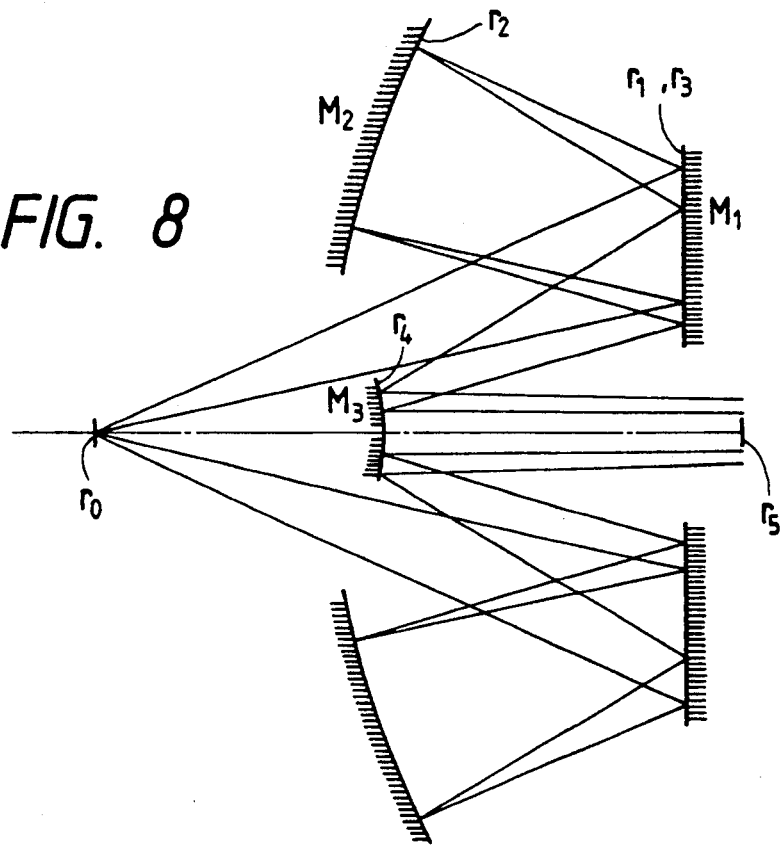
Figure 9:
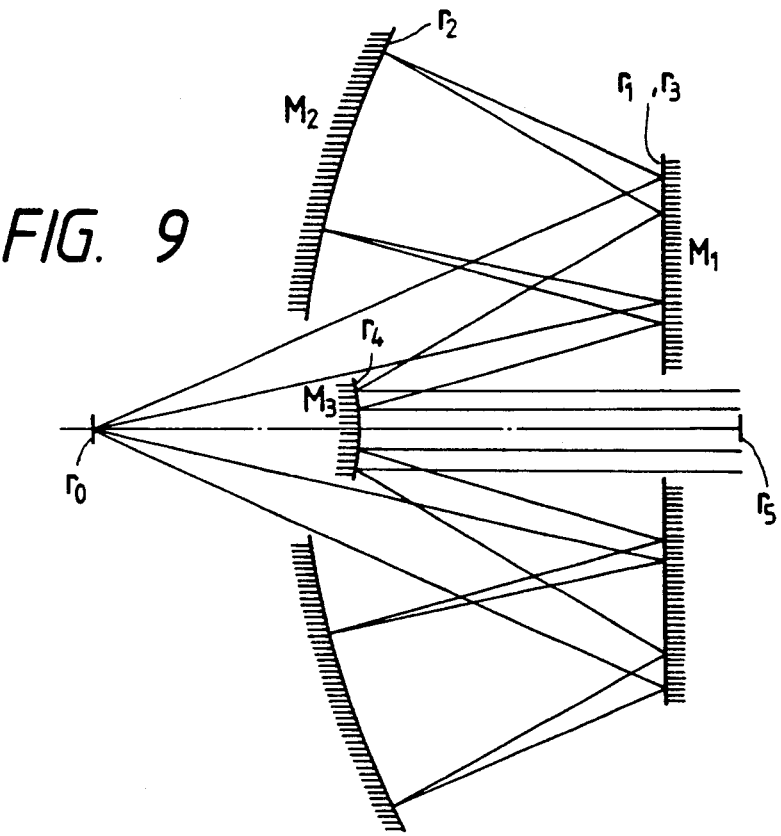
Figure 10:
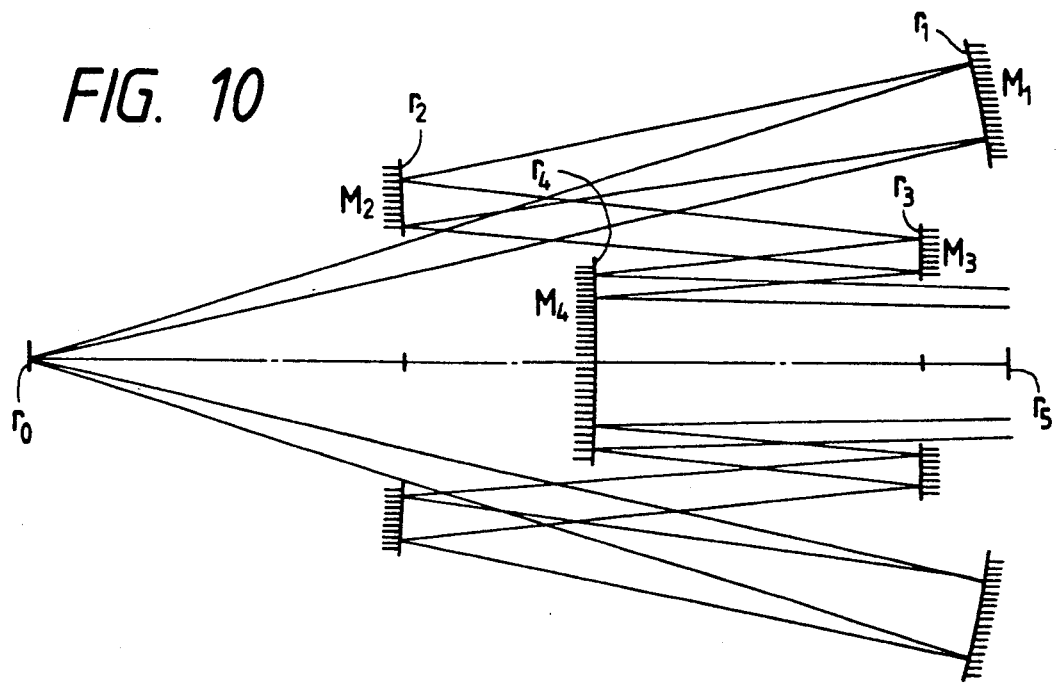
Figure 11:
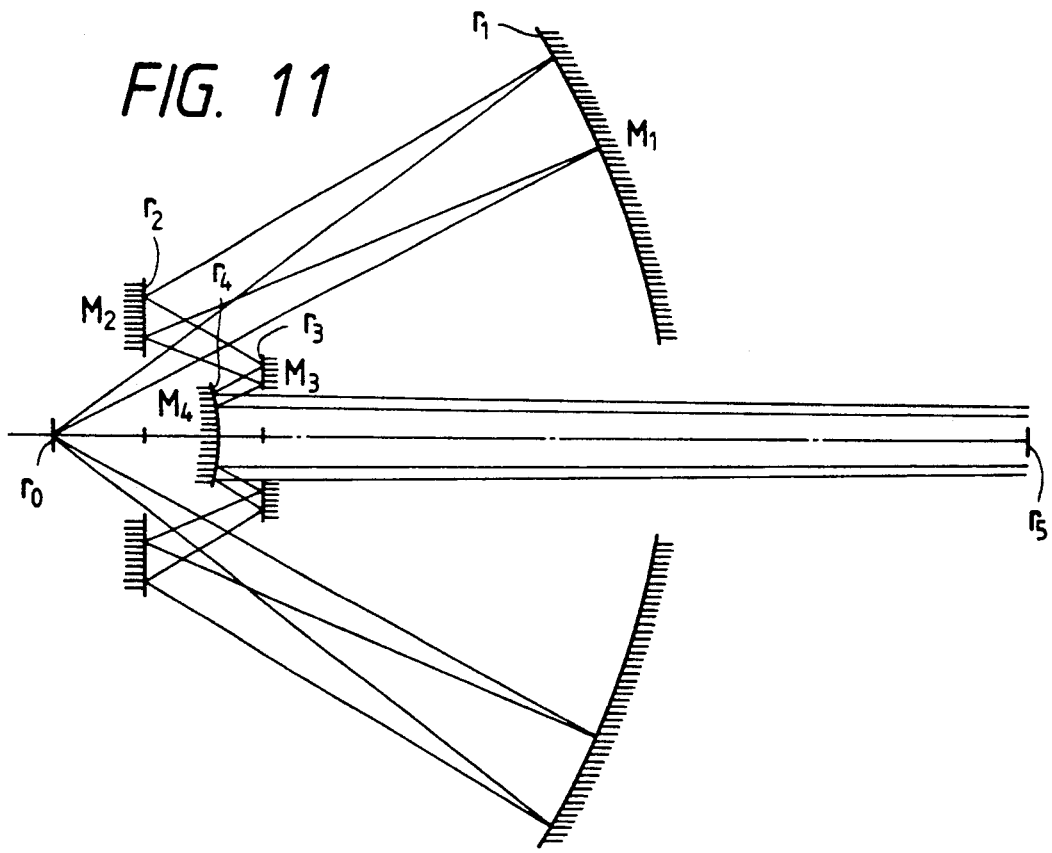
Figure 12:
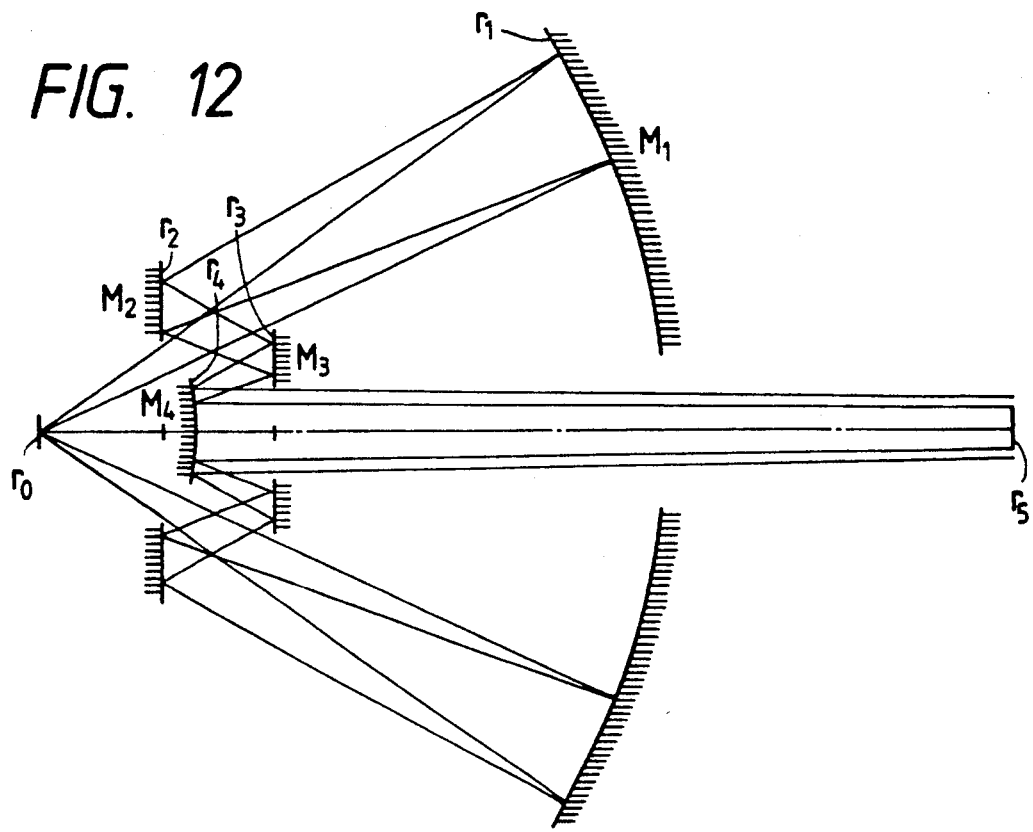
Figure 13:
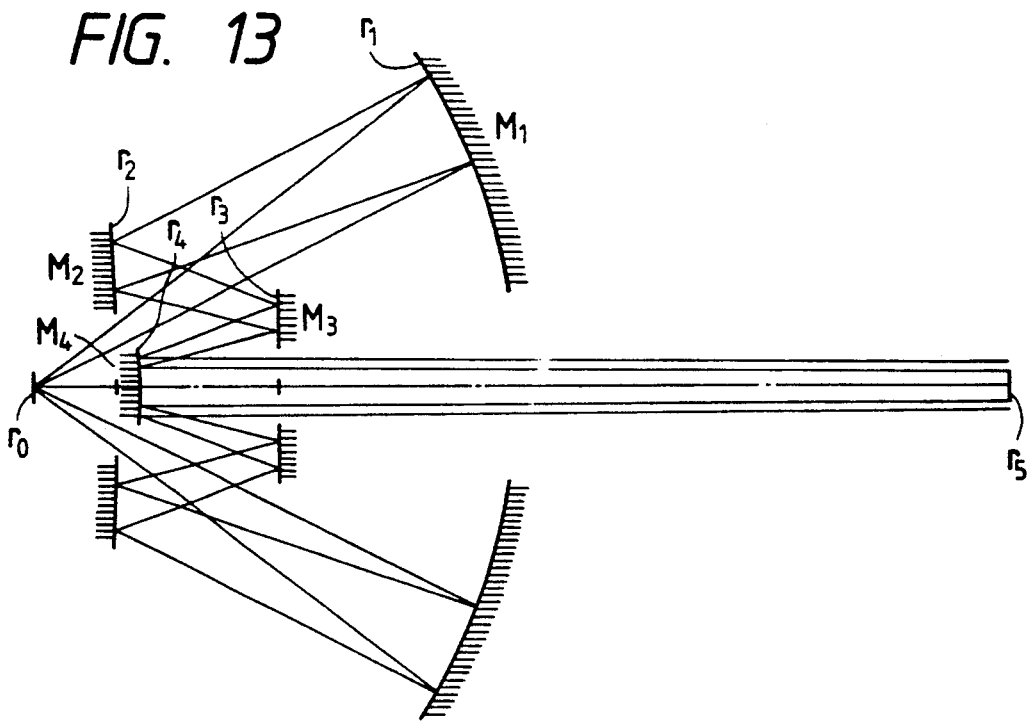
Figure 14:
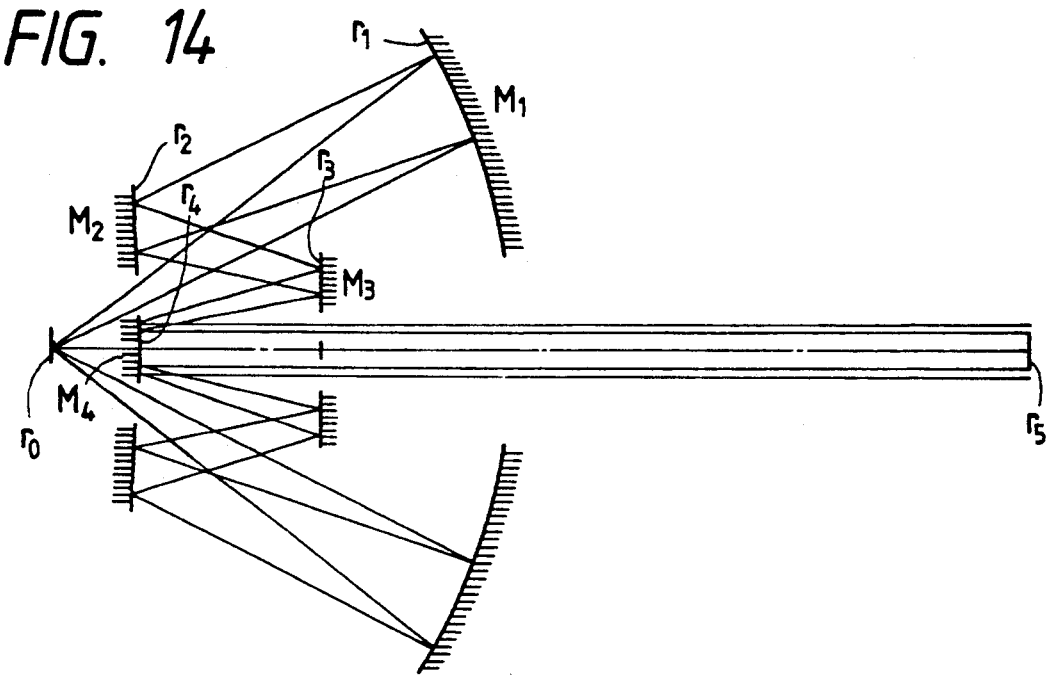
Figure 15:
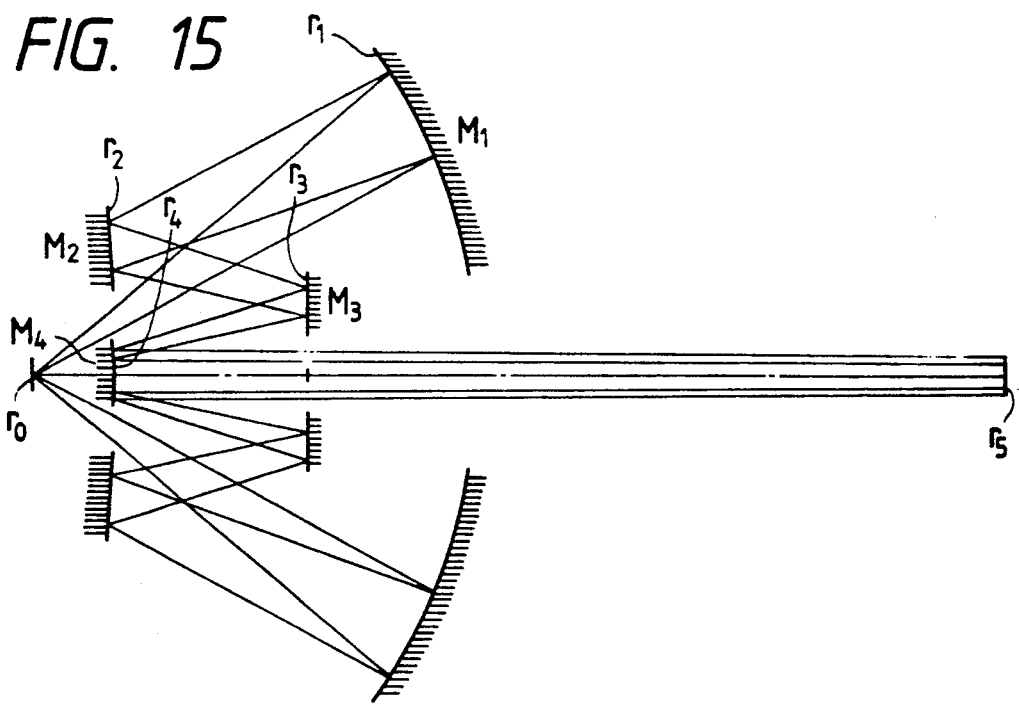

Now, the present invention will be described more detailedly below with reference to the preferred Embodiments illustrated in the accompanying drawings and given in the form of the following numerical data:

---

Embodiment 1 f = 18.363 (10X),   NA = 0.25,   IO = 210
shielded ratio = 42%   WFA = 0.001 λ

$r_0 = \infty$
  $d_0 = 60.0$
$r_1 = -2760.047$
  $d_1 = -40.0$
$r_2 = 89.774$
  $d_2 = 40.0$
$r_3 = -2760.047$
  $d_3 = -24.824$
$r_4 = -29.936$
  $d_4 = 24.824$
$r_5 = \infty$
  $L_{23} = 64.82$,   $|r_2/r_3| \times (f/L_{23}) = 8.5$
  $|2/r_1| \times L_{23}^2/f = 0.17$

| Embodiment 2 |
| --- |
| $f = 18.0,\quad NA = 0.25,\quad IO = \infty$ |
| shielded ratio = 42%,  WFA = 0.001 λ |
| $r_0 = \infty$ |
| $\quad d_0 = 58.184$ |
| $r_1 = -2544.113$ |
| $\quad d_1 = -40.184$ |
| $r_2 = 90.384$ |
| $\quad d_2 = 40.184$ |
| $r_3 = -2544.113$ |
| $\quad d_3 = -25.440$ |
| $r_4 = -29.502$ |
| $\quad d_4 = 27.256$ |
| $r_5 = \infty$ |
| $L_{23} = 65.62,\quad |r_2/r_3| \times (f/L_{23}) = 8.39$ |
| $|2/r_1| \times (L_{23}^2/f) = 0.16$ |

| Embodiment 3 |
| --- |
| $f = 9.424\ (20X),\quad NA = 0.4,\quad IO = 210$ |
| shielded ratio = 21%  WFA = 0.003 λ |
| $r_0 = \infty$ |
| $\quad d_0 = 54.747$ |
| $r_1 = -17554.737$ |
| $\quad d_1 = -32.719$ |
| $r_2 = 76.396$ |
| $\quad d_2 = 32.719$ |
| $r_3 = -17554.737$ |
| $\quad d_3 = -27.693$ |
| $r_4 = -14.685$ |
| $\quad d_4 = 32.946$ |
| $r_5 = \infty$ |
| $L_{23} = 60.41,\quad |r_2/r_3| \times (f/L_{23}) = 8.11$ |
| $|2/r_1| \times (L_{23}^2/f) = 0.044$ |

| Embodiment 4 |
| --- |
| $f = 18.0,\quad NA = 0.4,\quad IO = \infty$ |
| shielded ratio = 21%,  WFA = 0.008 λ |
| $r_0 = \infty$ |
| $\quad d_0 = 52.921$ |
| $r_1 = -9702.702$ |
| $\quad d_1 = -33.565$ |
| $r_2 = 77.199$ |
| $\quad d_2 = 33.565$ |
| $r_3 = -9702.702$ |
| $\quad d_3 = -28.319$ |
| $r_4 = -14.387$ |
| $\quad d_4 = 35.398$ |
| $r_5 = \infty$ |
| $L_{23} = 61.88,\quad |r_2/r_3| \times (f/L_{23}) = 7.81$ |
| $|2/r_1| \times (L_{23}^2/f) = 0.088$ |

| Embodiment 5 |
| --- |
| $f = 20.45\ (10X),\quad NA = 0.3,\quad IO = 210$ |
| shielded ratio = 49%,  WFA = 0.002 λ |
| $r_0 = \infty$ |
| $\quad d_0 = 59.957$ |
| $r_1 = -72.673$ |
| $\quad d_1 = -37.030$ |
| $r_2 = -245.472$ |
| $\quad d_2 = 31.735$ |
| $r_3 = \infty$ |
| $\quad d_3 = -19.662$ |
| $r_4 = -135.812$ |
| $\quad d_4 = 25.0$ |
| $r_5 = \infty$ |
| $L_{01} = 59.957,\quad |\phi_2| = 0.167,\quad |\phi_3| = 0$ |
| $(|\Delta M_{13}|.f)/L_{01}^2 = 0.030$ |

| Embodiment 6 |
| --- |
| $f = 4.079\ (50X),\quad NA = 0.6,\quad IO = 210$ |
| shielded ratio = 42%,  WFA = 0.012 λ |
| $r_0 = \infty$ |
| $\quad d_0 = 38.026$ |
| $r_1 = -42.132$ |
| $\quad d_1 = -32.341$ |
| $r_2 = -3416.091$ |
| $\quad d_2 = 7.257$ |
| $r_3 = \infty$ |
| $\quad d_3 = -2.755$ |
| $r_4 = -10.271$ |
| $\quad d_4 = 49.813$ |
| $r_5 = \infty$ |
| $L_{01} = 38.026,\quad |\phi_2| = 0.0012,\quad |\phi_3| = 0$ |
| $(|\Delta M_{13}|.f)/L_{01}^2 = 0.071$ |

| Embodiment 7 |
| --- |
| $f = 4.09\ (50X),\quad NA = 0.6,\quad IO = 210$ |
| shielded ratio = 42%,  WFA = 0.011 λ |
| $r_0 = \infty$ |
| $\quad d_0 = 38.778$ |
| $r_1 = -42.897$ |
| $\quad d_1 = -31.292$ |
| $r_2 = \infty$ |
| $\quad d_2 = 6.981$ |
| $r_3 = 1630.314$ |
| $\quad d_3 = -4.815$ |
| $r_4 = -10.294$ |
| $\quad d_4 = 50.347$ |
| $r_5 = \infty$ |
| $L_{01} = 38.778,\quad |\phi_2| = 0,\quad |\phi_3| = 0.0025$ |
| $(|\Delta M_{13}|.f)/L_{01}^2 = 0.066$ |

| Embodiment 8 |
| --- |
| $f = 2.597\ (80X),\quad NA = 0.65,\quad IO = 210$ |
| shielded ratio = 42%,  WFA = 0.047 λ |
| $r_0 = \infty$ |
| $\quad d_0 = 29.943$ |
| $r_1 = -35.184$ |
| $\quad d_1 = -14.931$ |
| $r_2 = -143.845$ |
| $\quad d_2 = 10.011$ |
| $r_3 = \infty$ |
| $\quad d_3 = -8.634$ |
| $r_4 = -9.838$ |
| $\quad d_4 = 53.622$ |
| $r_5 = \infty$ |
| $L_{01} = 29.943,\quad |\phi_2| = 0.036,\quad |\phi_3| = 0$ |
| $(|\Delta M_{13}|.f)/L_{01}^2 = 0.043$ |

| Embodiment 9 |
| --- |
| $f = 2.25,\quad NA = 0.65,\quad IO = \infty$ |
| shielded ratio = 42%,  WFA = 0.048 λ |
| $r_0 = \infty$ |
| $\quad d_0 = 28.422$ |
| $r_1 = -33.757$ |
| $\quad d_1 = -23.22$ |
| $r_2 = -113.118$ |
| $\quad d_2 = 11.189$ |
| $r_3 = \infty$ |
| $\quad d_3 = -11.034$ |
| $r_4 = -9.721$ |
| $\quad d_4 = 54.644$ |
| $r_5 = \infty$ |
| $L_{01} = 28.422,\quad |\phi_2| = 0.04,\quad |\phi_3| = 0$ |
| $(|\Delta M_{13}|.f)/L_{01}^2 = 0.034$ |

| Embodiment 10 |
| --- |
| f = 2.091 (100X),   NA = 0.7,   IO = 210 |
| shielded ratio = 42%,   WFA = 0.077 λ |
| $r_0 = \infty$ |
| $\quad d_0 = 27.524$ |
| $r_1 = -32.864$ |
| $\quad d_1 = -22.524$ |
| $r_2 = -101.946$ |
| $\quad d_2 = 11.817$ |
| $r_3 = \infty$ |
| $\quad d_3 = -11.817$ |
| $r_4 = -9.663$ |
| $\quad d_4 = 55.0$ |
| $r_5 = \infty$ |
| $L_{01} = 27.524$,   $|\phi_2| = 0.041$,   $|\phi_3| = 0$ |
| $(|\Delta M_{13}| \cdot f)/L_{01}^2 = 0.03$ |

| Embodiment 11 |
| --- |
| f = 18.9 (10X),   NA = 0.25,   image height = 10.5 |
| IO = 210,   shielded ratio = 49%,   WFA = 0.009 |
| $r_0 = \infty$ |
| $\quad d_0 = 60.000$ |
| $r_1 = \infty$ |
| $\quad d_1 = -40.000$ |
| $r_2 = 91.595$ (aspherical surface) |
| $\quad d_2 = 40.000$ |
| $r_3 = \infty$ |
| $\quad d_3 = -29.333$ |
| $r_4 = -33.09$ (aspherical surface) |
| $\quad d_4 = 29.333$ |
| $r_5 = \infty$ |
| aspherical surface coefficient |
| (2nd surface) |
| $K = -0.009124$ (e = 0.0955) |
| $A = 0.1176 \times 10^{-7}$, $B = -0.1238 \times 10^{-10}$ |
| $C = 0.2238 \times 10^{-13}$, $D = -0.1295 \times 10^{-16}$ |
| (4th surface) |
| $K = 6.0263$ (e = 0.9261) |
| $A = 0.1751 \times 10^{-4}$, $B = 0.1051 \times 10^{-6}$ |
| $C = -0.5134 \times 10^{-9}$, $D = -0.5469 \times 10^{-17}$ |
| $L_{01} = 100$,   $|\delta_2| = 1.241 \times 10^{-4}$ |
| $|\delta_4| = 2.772 \times 10^{-4}$ |
| $\Sigma OPD \times (f/L_{01}^2) = 1.08 \times 10^{-5}$ |

| Embodiment 12 |
| --- |
| f = 9.53 (20X),   NA = 0.4,   image height = 10.5 |
| IO = 210,   shielded ratio = 30%,   WFA = 0.003 |
| $r_0 = \infty$ |
| $\quad d_0 = 50.265$ |
| $r_1 = \infty$ |
| $\quad d_1 = -30.392$ |
| $r_2 = 70.783$ (aspherical surface) |
| $\quad d_2 = 30.392$ |
| $r_3 = \infty$ |
| $\quad d_3 = -25.431$ |
| $r_4 = -15.065$ (aspherical surface) |
| $\quad d_4 = 35.166$ |
| $r_5 = \infty$ |
| aspherical surface coefficient |
| (2nd surface) |
| $K = -0.000067$ (e = 0.0082) |
| $A = 0.4477 \times 10^{-8}$, $B = 0.1077 \times 10^{-11}$ |
| $C = 0.2065 \times 10^{-15}$, $D = 0.5609 \times 10^{-19}$ |
| (4th surface) |
| $K = 0.4134$ (e = 0.541) |
| $A = 0.1631 \times 10^{-5}$, $B = -0.6342 \times 10^{-7}$ |
| $C = -0.1338 \times 10^{-16}$, $D = 0.1159 \times 10^{-22}$ |
| $L_{01} = 80.7$,   $|\delta_2| = 1.904 \times 10^{-4}$ |
| $|\delta_4| = 7.961 \times 10^{-4}$ |
| $\Sigma OPD \times (f/L_{01}^2) = 1.60 \times 10^{-5}$ |

| Embodiment 13 |
| --- |
| f = 9.00,   NA = 0.4,   image height = 0.525 |
| IO = ∞,   shielded ratio = 30%,   WFA = 0.003 |
| $r_0 = \infty$ |
| $\quad d_0 = 45.715$ |
| $r_1 = \infty$ |
| $\quad d_1 = -30.766$ |
| $r_2 = 69.755$ (aspherical surface) |
| $\quad d_2 = 30.766$ |
| $r_3 = \infty$ |
| $\quad d_3 = -25.805$ |
| $r_4 = -15.090$ (aspherical surface) |
| $\quad d_4 = 40.090$ |
| $r_5 = \infty$ |
| aspherical surface coefficient |
| (2nd surface) |
| $K = -0.007044$ (e = 0.0836) |
| $A = 0.5054 \times 10^{-8}$, $B = 0.3564 \times 10^{-11}$ |
| $C = -0.2448 \times 10^{-14}$, $D = 0.1160 \times 10^{-17}$ |
| (4th surface) |
| $K = 0.3426$ (e = 0.505) |
| $A = -0.1049 \times 10^{-4}$, $B = -0.8342 \times 10^{-7}$ |
| $C = -0.1337 \times 10^{-16}$, $D = 0.1160 \times 10^{-22}$ |
| $L_{01} = 76.5$,   $|\delta_2| = 2.896 \times 10^{-4}$ |
| $|\delta_4| = 1.151 \times 10^{-3}$ |
| $\Sigma OPD \times (f/L_{01}^2) = 2.28 \times 10^{-5}$ |

| Embodiment 14 |
| --- |
| f = 3.98 (50X),   NA = 0.65,   image height = 10.5 |
| IO = 210,   shielded ratio = 13%,   WFA = 0.004 |
| $r_0 = \infty$ |
| $\quad d_0 = 37.559$ |
| $r_1 = -31.612$ (aspherical surface) |
| $\quad d_1 = -24.429$ |
| $r_2 = -5.805$ (aspherical surface) |
| $\quad d_2 = 46.869$ |
| $r_3 = \infty$ |
| aspherical surface coefficient |
| (1st surface) |
| $K = -0.0031$ (e = 0.0556) |
| $A = 0.1178 \times 10^{-7}$, $B = 0.2067 \times 10^{-10}$ |
| $C = -0.2617 \times 10^{-13}$, $D = 0.4283 \times 10^{-16}$ |
| (2nd surface) |
| $K = 0.3756$ (e = 0.523) |
| $A = 0.1579 \times 10^{-3}$, $B = -0.1191 \times 10^{-5}$ |
| $C = -0.9051 \times 10^{-8}$, $D = -0.3210 \times 10^{-9}$ |
| $L_{01} = 37.6$,   $|\delta_2| = 2.867 \times 10^{-5}$ |
| $|\delta_2| = 2.739 \times 10^{-3}$ |
| $\Sigma OPD \times (f/L_{01}^2) = 4.89 \times 10^{-5}$ |

| Embodiment 15 |
| --- |
| f = 3.98 (50X),   NA = 0.65,   image height = 10.5 |
| IO = 210,   shielded ratio = 13%,   WFA = 0.009 |
| $r_0 = \infty$ |
| $\quad d_0 = 38.510$ |
| $r_1 = -32.405$ (aspherical surface) |
| $\quad d_1 = -25.114$ |
| $r_2 = -5.796$ (aspherical surface) |
| $\quad d_2 = 46.604$ |
| $r_3 = \infty$ |
| aspherical surface coefficient |
| (1st surface) |
| $K = -0.0014$ (e = 0.0376) |
| (2nd surface) |
| $K = 0.350$ (e = 0.510) |
| $L_{01} = 38.5$,   $|\delta_1| = 1.576 \times 10^{-4}$ |
| $|\delta_2| = 4.90 \times 10^{-3}$ |
| $\Sigma OPD \times (f/L_{01}^2) = 7.98 \times 10^{-5}$ |

| Embodiment 16 |
| --- |
| f = 2.02 (100X),   NA = 0.8,   image height = 10.5 |

Embodiment 16

IO = 210, shielded ratio = 7%, WFA = 0.004
$r_0 = \infty$
$\quad d_0 = 35.12$
$r_1 = -30.712$ (aspherical surface)
$\quad d_1 = -25.728$
$r_2 = -3.141$ (aspherical surface)
$\quad d_2 = 50.607$
$r_3 = \infty$
aspherical surface coefficient
(1st surface)
$K = -0.00066$ ($e = 0.0256$)
$A = -0.8066 \times 10^{-9}, B = 0.1422 \times 10^{-10}$
$C = -0.2514 \times 10^{-13}, D = 0.2349 \times 10^{-16}$
(2nd surface)
$K = 0.4915$ ($e = 0.574$)
$A = 0.1816 \times 10^{-3}, B = -0.1191 \times 10^{-5}$
$C = -0.9051 \times 10^{-8}, D = -0.3210 \times 10^{-9}$
$L_{01} = 35.1, \quad |\delta_1| = 2.874 \times 10^{-4}$
$|\delta_2| = 1.142 \times 10^{-2}$
$\Sigma OPD \times (f/L_{01}^2) = 5.37 \times 10^{-5}$

Embodiment 17 f = 18.616 (10X), NA = 0.3, image height = 10.5
IO = 210, shielded ratio = 49%, WFA = 0.002
$r_0 = \infty$
$\quad d_0 = 57.647$
$r_1 = -89.073$
$\quad d_1 = -26.544$
$r_2 = 171.562$ (aspherical surface)
$\quad d_2 = 20.419$
$r_3 = \infty$
$\quad d_3 = -16.522$
$r_4 = -45.147$ (aspherical surface)
$\quad d_4 = 25.0$
$r_5 = \infty$
aspherical surface coefficient
(2nd surface)
$K = -2.426$
$A = -0.4935 \times 10^{-7}, B = 0.1232 \times 10^{-9}$
$C = -0.5092 \times 10^{-12}, D = 0.7575 \times 10^{-15}$
(4th surface)
$K = 2.164$
$A = -0.1053 \times 10^{-5}, B = -0.1804 \times 10^{-7}$
$C = 0.2249 \times 10^{-9}, D = 0.1365 \times 10^{-17}$
$|\phi_4| = 0.825, \quad L_{01} = 57.65$
$(|\Delta M_{13}| \times f)/L_{01}^2 = 0.034$

Embodiment 18 f = 10.081 (20X), NA = 0.4, image height = 10.5
IO = 210, shielded ratio = 49%, WFA = 0.002
$r_0 = \infty$
$\quad d_0 = 49.705$
$r_1 = -66.745$ (aspherical surface)
$\quad d_1 = -31.705$
$r_2 = 251.254$ (aspherical surface)
$\quad d_2 = 16.016$
$r_3 = \infty$
$\quad d_3 = -16.257$
$r_4 = -27.017$ (aspherical surface)
$\quad d_4 = 42.241$
$r_5 = \infty$
aspherical surface coefficient
(1st surface)
$K = 0.1254$
$A = -0.5416 \times 10^{-7}, B = -0.7677 \times 10^{-11}$
$C = -0.7486 \times 10^{-13}, D = 0.3679 \times 10^{-16}$
(2nd surface)
$K = -144.7$
$A = 0.379 \times 10^{-6}, B = -0.1154 \times 10^{-8}$
$C = 0.1337 \times 10^{-12}, D = 0.8476 \times 10^{-15}$
(4th surface)
$K = -0.040$
$A = -0.9085 \times 10^{-5}, B = 0.1759 \times 10^{-7}$
$C = 0.1817 \times 10^{-15}, D = 0.7730 \times 10^{-20}$

Embodiment 18

$|\phi_4| = 0.746, \quad L_{01} = 49.71$
$(|\Delta M_{13}| \times f)/L_{01}^2 = 0.064$

Embodiment 19 f = 9.914 (20X), NA = 0.4, image height = 10.5
IO = 210, shielded ratio = 43%, WFA = 0.001
$r_0 = \infty$
$\quad d_0 = 51.515$
$r_1 = -65.533$ (aspherical surface)
$\quad d_1 = -33.025$
$r_2 = 325.343$ (aspherical surface)
$\quad d_2 = 16.172$
$r_3 = \infty$
$\quad d_3 = -13.80$
$r_4 = -26.169$
$\quad d_4 = 39.138$
$r_5 = \infty$
aspherical surface coefficient
(1st surface)
$K = 0.149$
$A = -0.759 \times 10^{-7}, B = -0.1344 \times 10^{-10}$
$C = -0.9162 \times 10^{-13}, D = 0.7886 \times 10^{-16}$
(2nd surface)
$K = -232.7$
$A = -0.3437 \times 10^{-6}, B = -0.7614 \times 10^{-9}$
$C = -0.1791 \times 10^{-11}, D = 0.6422 \times 10^{-14}$
$|\phi_4| = 0.758, \quad L_{01} = 51.52$
$(|\Delta M_{13}| \times f)/L_{01}^2 = 0.063$

Embodiment 20 f = 10.02 (20X), NA = 0.4, image height = 10.5
IO = 210, shielded ratio = 49%, WFA = 0.041
$r_0 = \infty$
$\quad d_0 = 53.514$
$r_1 = -65.241$
$\quad d_1 = -35.514$
$r_2 = 430.57$
$\quad d_2 = 13.888$
$r_3 = \infty$
$\quad d_3 = -13.189$
$r_4 = -26.095$ (aspherical surface)
$\quad d_4 = 41.301$
$r_5 = \infty$
aspherical surface coefficient
(4th surface)
$K = -1.68$
$A = -0.4481 \times 10^{-4}, B = -0.1879 \times 10^{-7}$
$C = 0.4261 \times 10^{-15}, D = 0.1125 \times 10^{-19}$
$|\phi_4| = 0.768, \quad L_{01} = 53.51$
$(|\Delta M_{13}| \times f)/L_{01}^2 = 0.076$

Embodiment 21 f = 4.108 (50X), NA = 0.6, image height = 10.5
IO = 210, shielded ratio = 43%, WFA = 0.001
$r_0 = \infty$
$\quad d_0 = 42.262$
$r_1 = -48.054$
$\quad d_1 = -34.308$
$r_2 = 1100.224$ (aspherical surface)
$\quad d_2 = 8.231$
$r_3 = \infty$
$\quad d_3 = -7.251$
$r_4 = -10.470$
$\quad d_4 = 51.066$
$r_5 = \infty$
aspherical surface coefficient
(1st surface)
$K = 0.0467$
$A = -0.7787 \times 10^{-7}, B = -0.4891 \times 10^{-10}$
$C = -0.2253 \times 10^{-13}, D = -0.3260 \times 10^{-16}$ -continued

Embodiment 21

(2nd surface)
K = −0.00002
A = −0.6849 × $10^{-5}$, B = 0.4602 × $10^{-8}$
C = −0.394 × $10^{-10}$, D = 0.1116 × $10^{-12}$
$|\phi_4|$ = 0.785,   $L_{01}$ = 42.26
$(|\Delta M_{13}| \times f)/L_{01}^2$ = 0.060

Embodiment 22 f = 4.089 (50X),   NA = 0.6,   image height = 10.5
IO = 210,   shielded ratio = 49%,   WFA = 0.001
$r_0$ = ∞
  $d_0$ = 39.884
$r_1$ = −43.884 (aspherical surface)
  $d_1$ = −31.390
$r_2$ = ∞
  $d_2$ = 6.919
$r_3$ = 804.006 (aspherical surface)
  $d_3$ = −5.717
$r_4$ = −10.320
  $d_4$ = 50.304
$r_5$ = ∞
aspherical surface coefficient
(1st surface)
K = 0.0244
A = −0.3625 × $10^{-7}$, B = −0.4297 × $10^{-10}$
C = 0.2185 × $10^{-15}$, D = −0.3072 × $10^{-16}$
(3rd surface)
K = −0.00006
A = 0.3436 × $10^{-4}$, B = 0.2182 × $10^{-7}$
C = −0.3958 × $10^{-9}$, D = −0.3153 × $10^{-18}$
$|\phi_4|$ = 0.793,   $L_{01}$ = 39.88
$(|\Delta M_{13}| \times f)/L_{01}^2$ = 0.063

Embodiment 23 f = 3.60,   NA = 0.6,   image height = 0.21
IO = ∞,   shielded ratio = 43%,   WFA = 0.001
$r_0$ = ∞
  $d_0$ = 39.363
$r_1$ = −45.347 (aspherical surface)
  $d_1$ = −31.477
$r_2$ = ∞
  $d_2$ = 8.574
$r_3$ = 491.5 (aspherical surface)
  $d_3$ = −9.028
$r_4$ = −10.347
  $d_4$ = 52.569
$r_5$ = ∞
aspherical surface coefficient
(1st surface)
K = 0.024
A = −0.403 × $10^{-7}$, B = −0.4432 × $10^{-10}$
C = −0.1792 × $10^{-14}$, D = −0.2659 × $10^{-16}$
(3rd surface)
K = 0.0
A = 0.2302 × $10^{-4}$, B = 0.2549 × $10^{-7}$
C = −0.9781 × $10^{-10}$, D = 0.2618 × $10^{-19}$
$|\phi_4|$ = 0.696,   $L_{01}$ = 39.36
$(|\Delta M_{13}| \times f)/L_{01}^2$ = 0.053

Embodiment 24 f = 2.09 (100X),   NA = 0.7,   image height = 10.5
IO = 210,   shielded ratio = 49%,   WFA = 0.005
$r_0$ = ∞
  $d_0$ = 51.916
$r_1$ = −58.137 (aspherical surface)
  $d_1$ = −43.901
$r_2$ = −112.443 (aspherical surface)
  $d_2$ = 14.640
$r_3$ = ∞
  $d_3$ = −17.614

Embodiment 24

$r_4$ = −8.792 (aspherical surface)
  $d_4$ = 54.959
$r_5$ = ∞
aspherical surface coefficient
(1st surface)
K = 0.131
A = 0.1035 × $10^{-7}$, B = −0.9119 × $10^{-12}$
C = 0.1038 × $10^{-14}$, D = −0.1298 × $10^{-17}$
(2nd surface)
K = 18.612
A = −0.3451 × $10^{-5}$, B = 0.4787 × $10^{-9}$
C = −0.1035 × $10^{-10}$, D = −0.182 × $10^{-13}$
(4th surface)
K = −5.297
A = −0.8828 × $10^{-3}$, B = −0.1174 × $10^{-12}$
C = −0.1286 × $10^{-20}$, D = 0.119 × $10^{-24}$
$|\phi_4|$ = 0.475,   $L_{01}$ = 51.92
$(|\Delta M_{13}| \times f)/L_{01}^2$ = 0.023 wherein the reference symbols $r_0$, $r_1$, $r_2$, . . . represent radii of curvature on the surfaces of the respective reflecting mirrors, and the reference symbols $d_0$, $d_1$, $d_2$, . . . designate intervals reserved between the respective reflecting surfaces, the reference symbol $r_0$ denoting a specimen surface. The reference symbols $d_0$, $d_1$, . . . are preceded by the positive sign when light travels rightward in the drawings or the negative sign when light travels in the reverse direction. In the numerical data, the shielded ratios represent values of $(NA_{min}/NA_{max})^2$ wherein the reference symbols $NA_{max}$ and $NA_{min}$ designate the maximum value and the minimum value of the numerical aperture for the light bundles allowed to pass through the respective reflecting objective systems as shown in the drawings illustrating the fundamental compositions thereof (FIG. 1, FIG. 2, FIG. 3 and FIG. 4).

Out of the preferred Embodiments, the Embodiments 2, 4, 9, 12 and 23 are of a type which forms an image at infinite distance, and aberrations of these embodiments are illustrated as those of the reflecting objective systems having an additional a planatic lens system having a focal length of f=180.

The numerical data list the wavefront aberrations (WFA) in axial values thereof which are calculated taking the shielded ratios into consideration and evaluated on a surface which is different from specimen surface selected for evaluating the aberrations indicated on the drawings illustrating aberration characteristics determined by tracing rays in the reverse direction so as to form images on the specimen surfaces.

Figure 16:
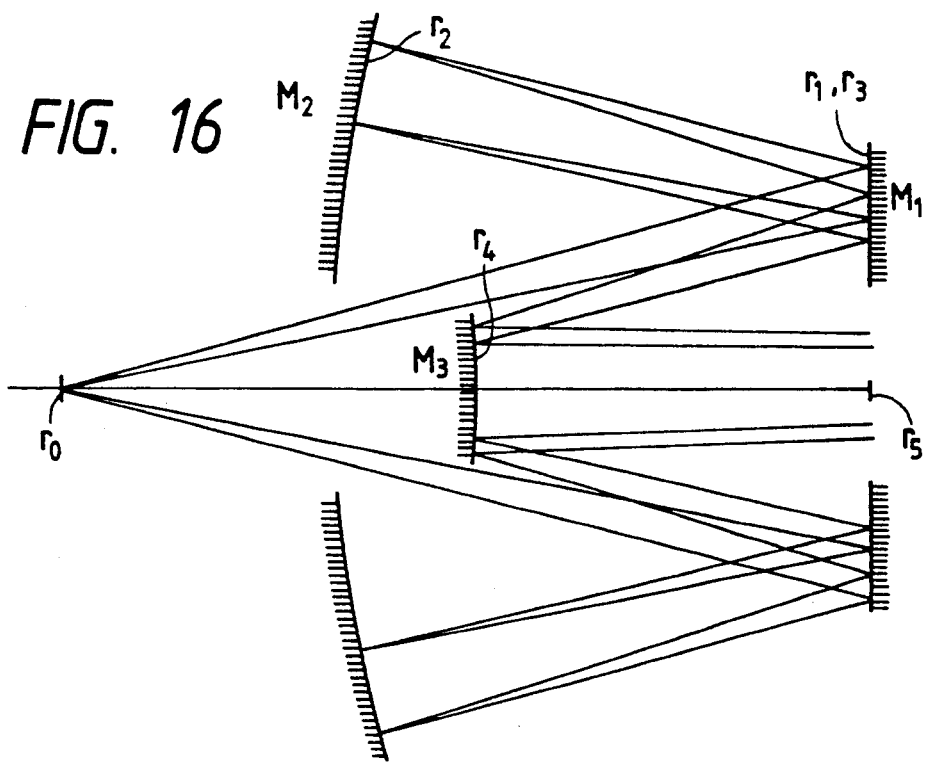
Figure 17:
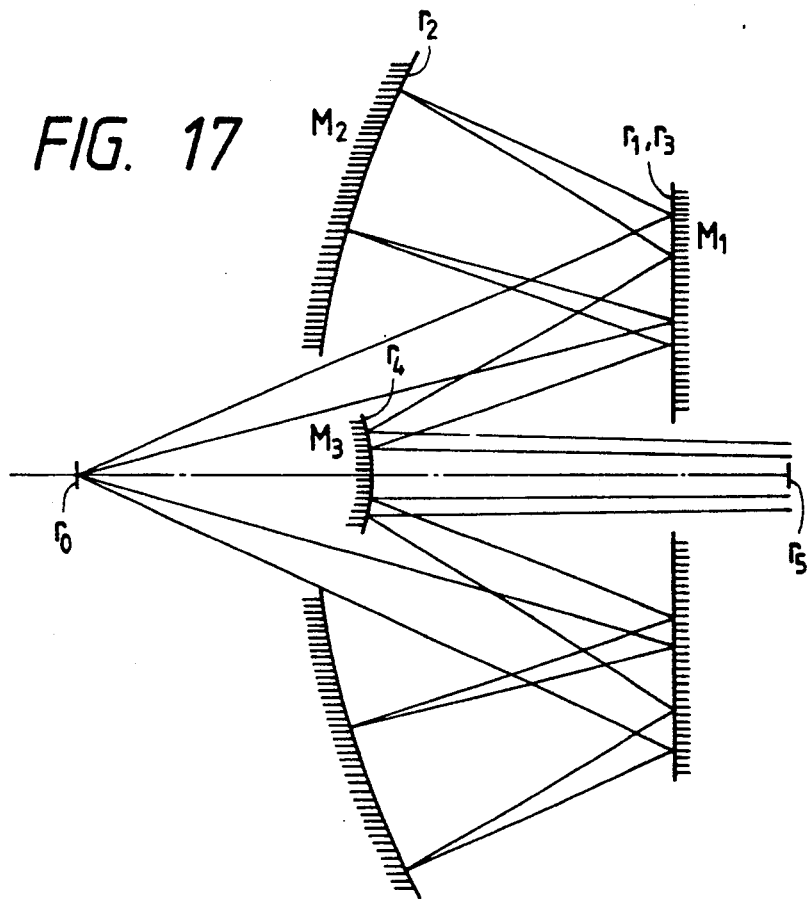
Figure 18:
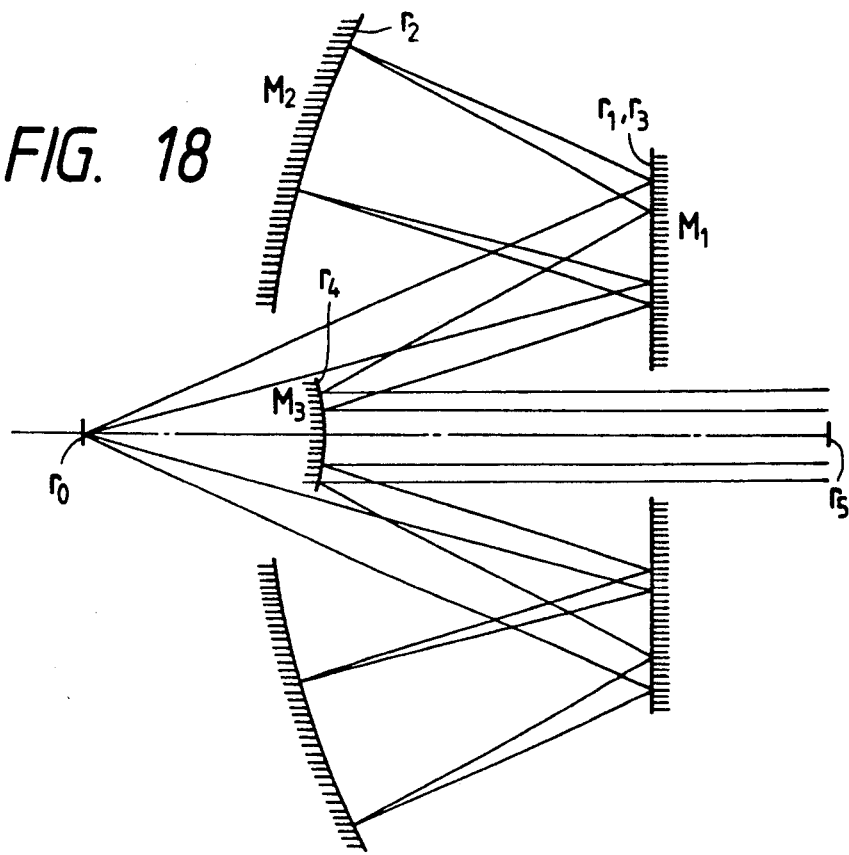
Figure 19:
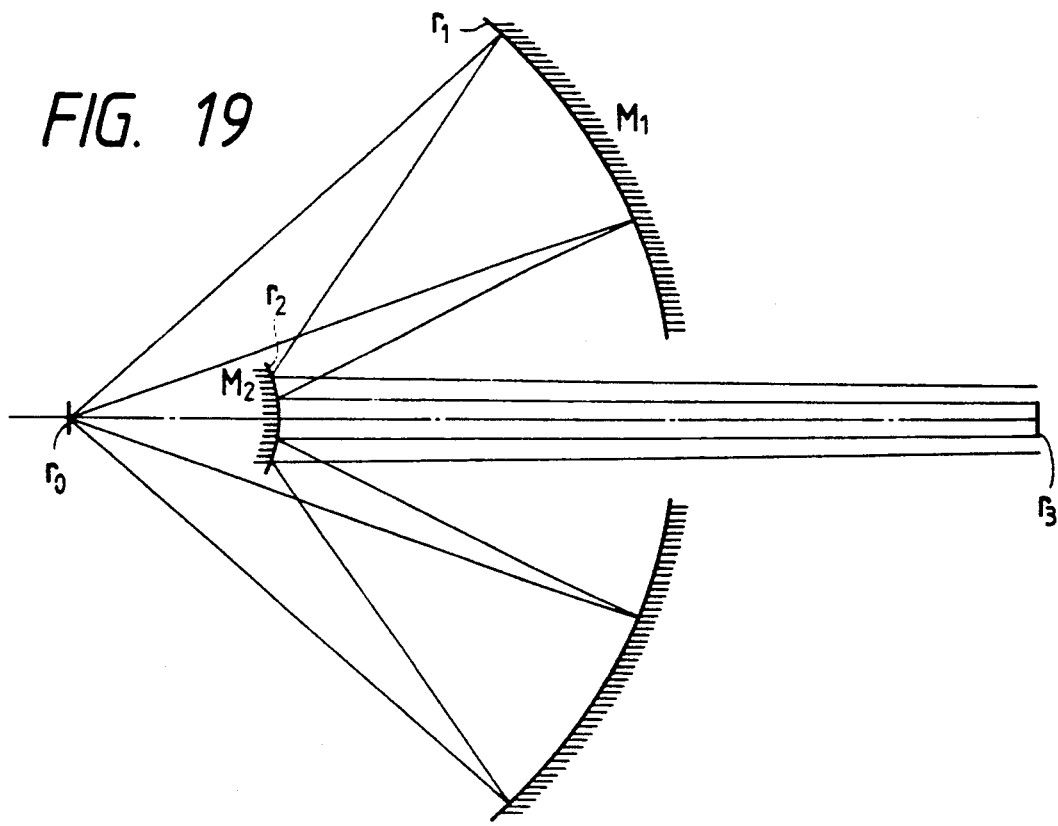
Figure 20:
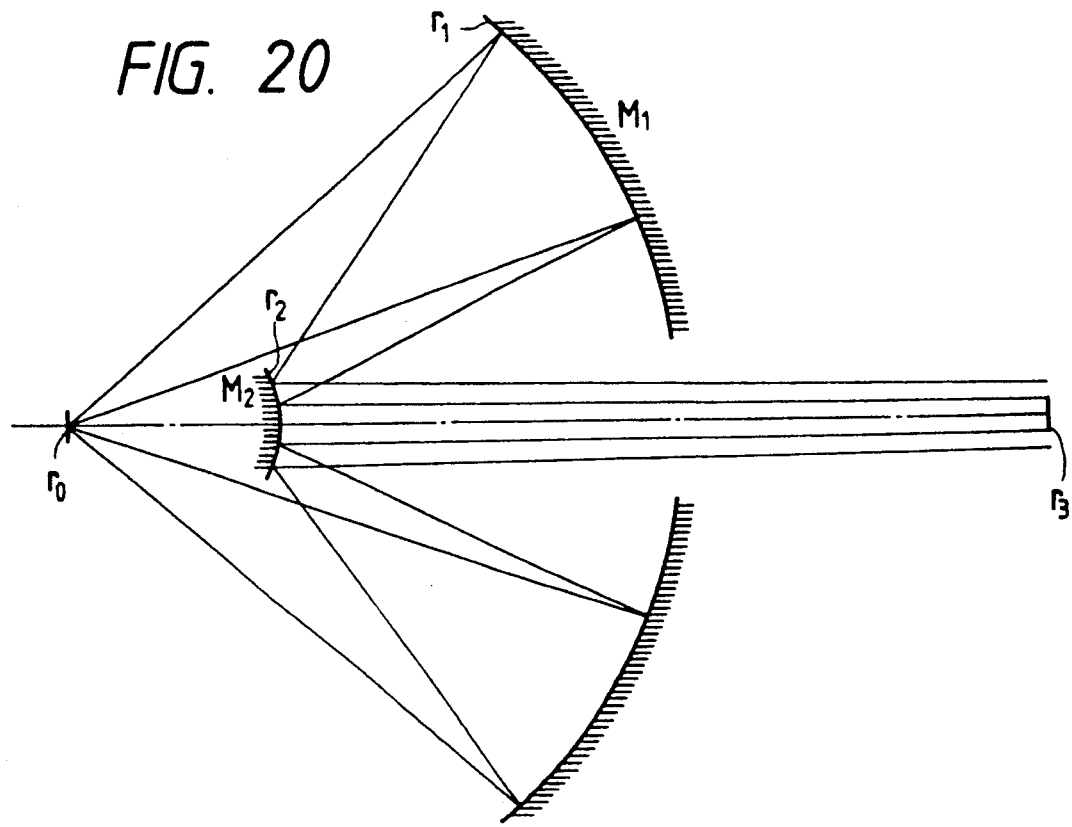
Figure 21:
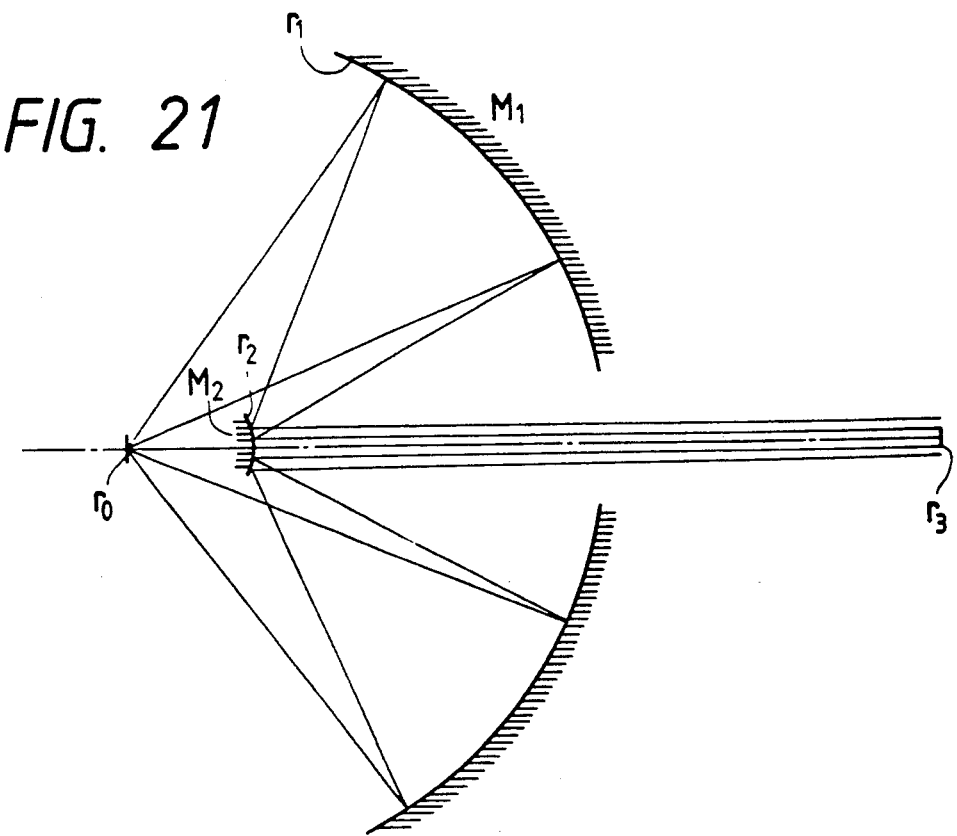
Figure 22:
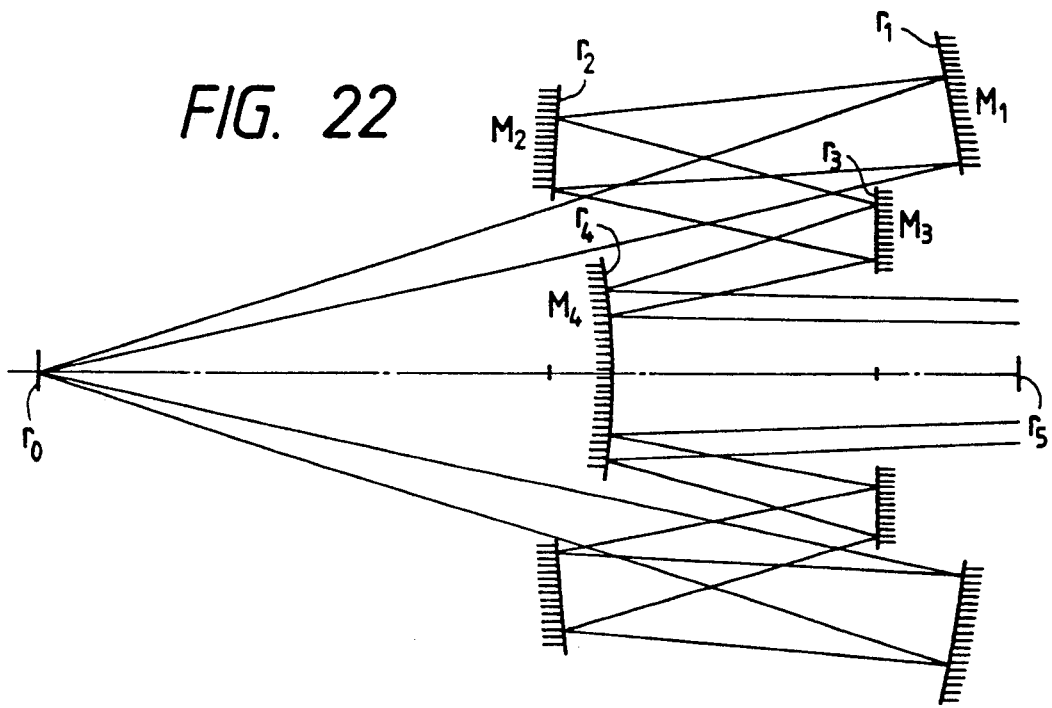
Figure 23:
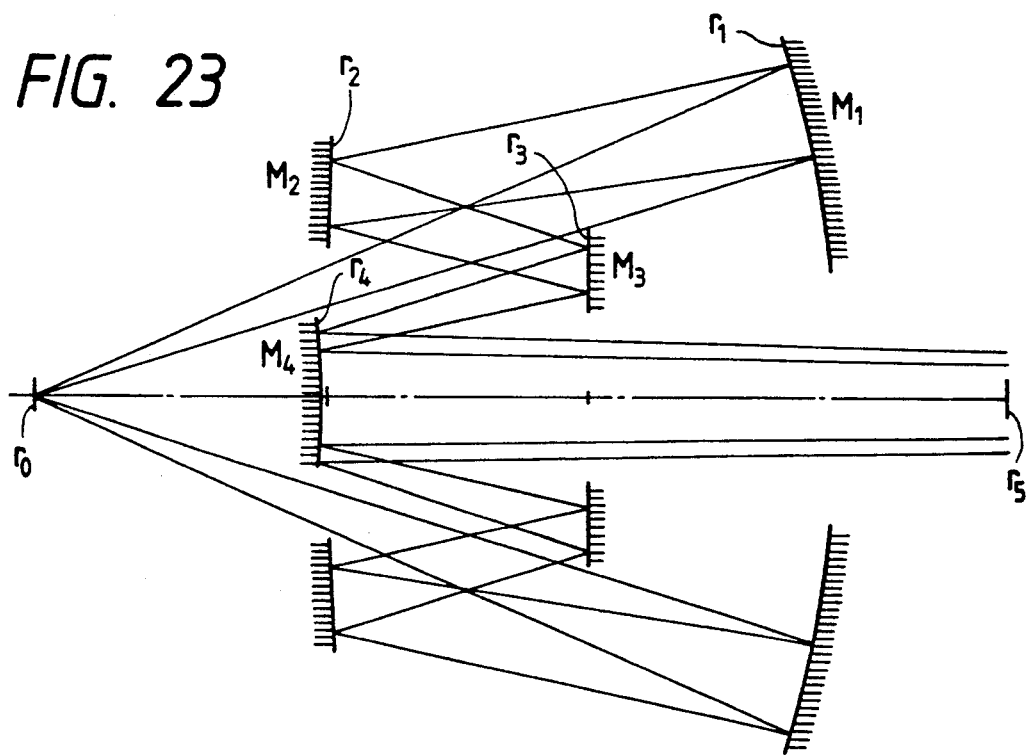
Figure 24:
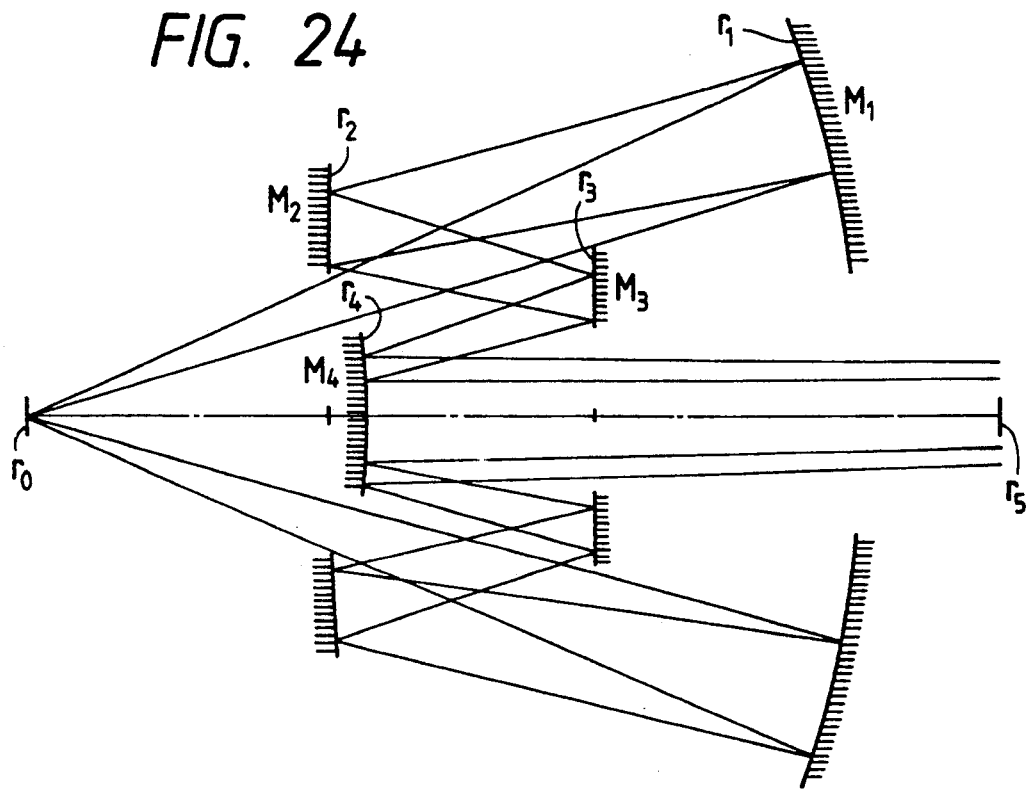
Figure 25:
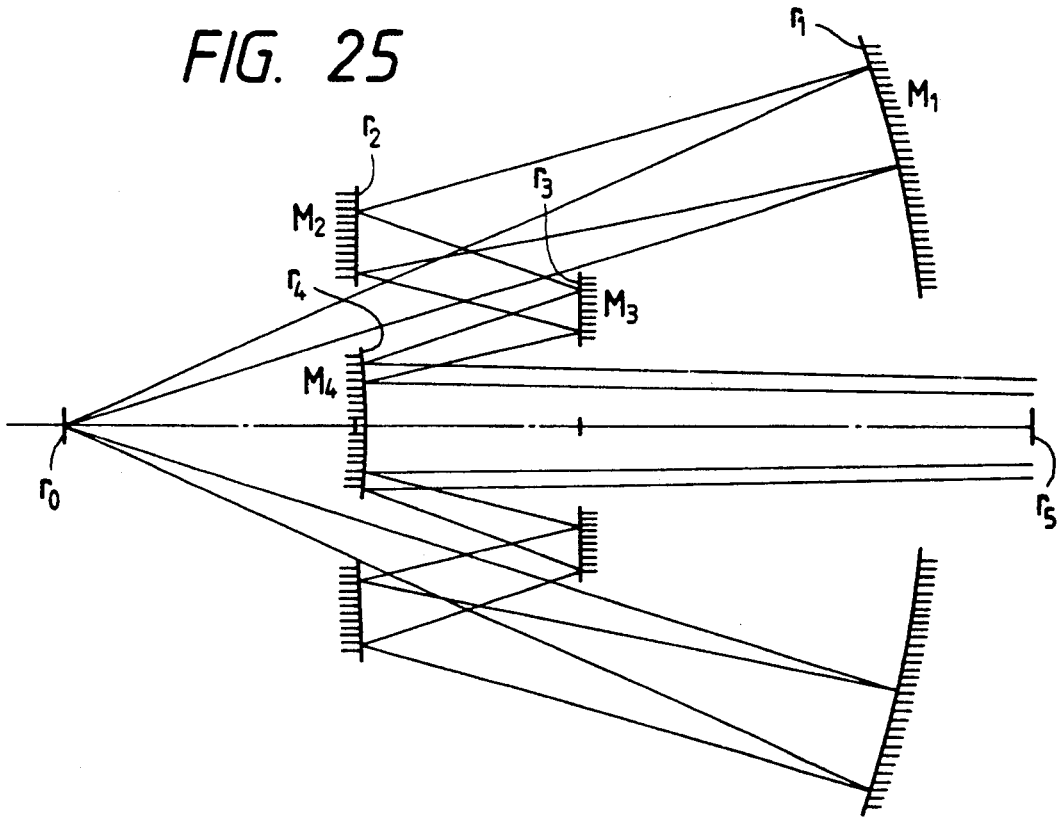
Figure 26:
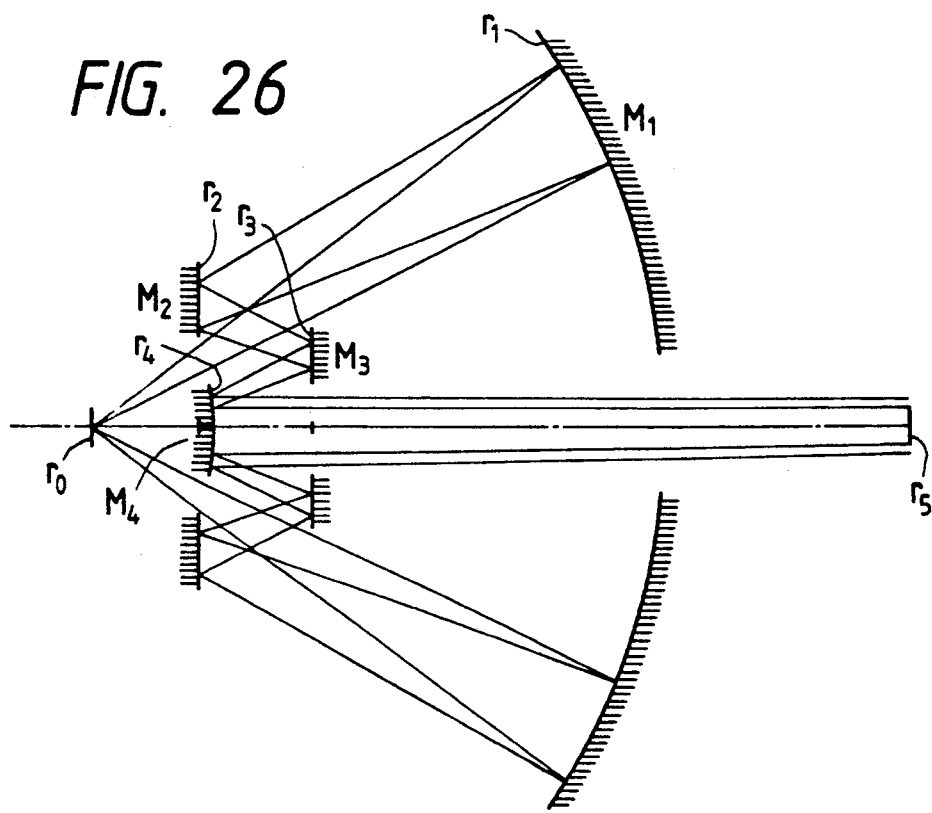
Figure 27:
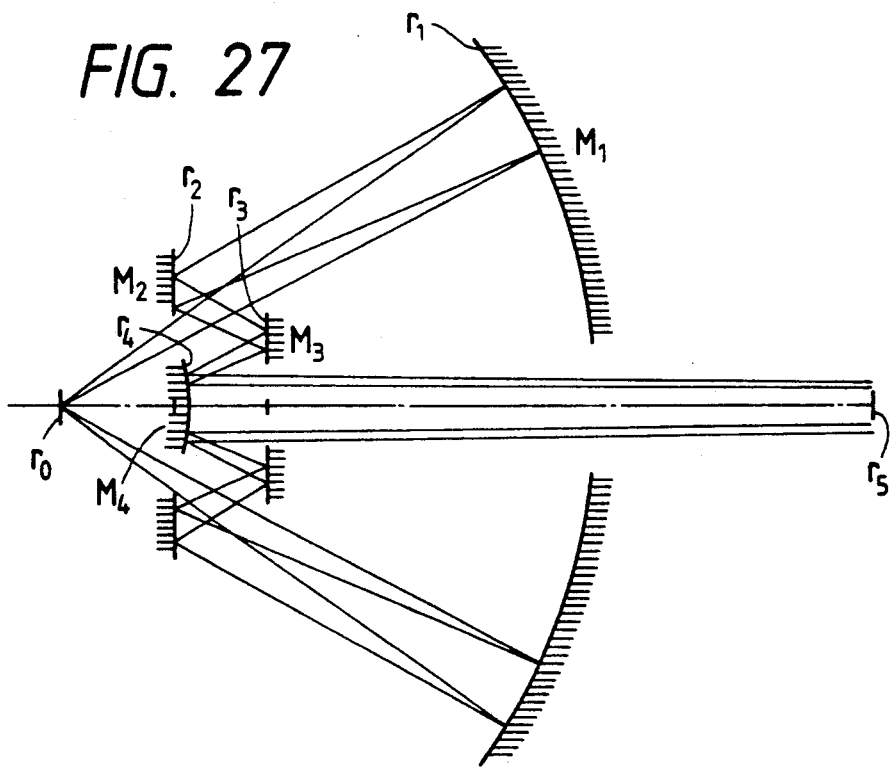
Figure 28:
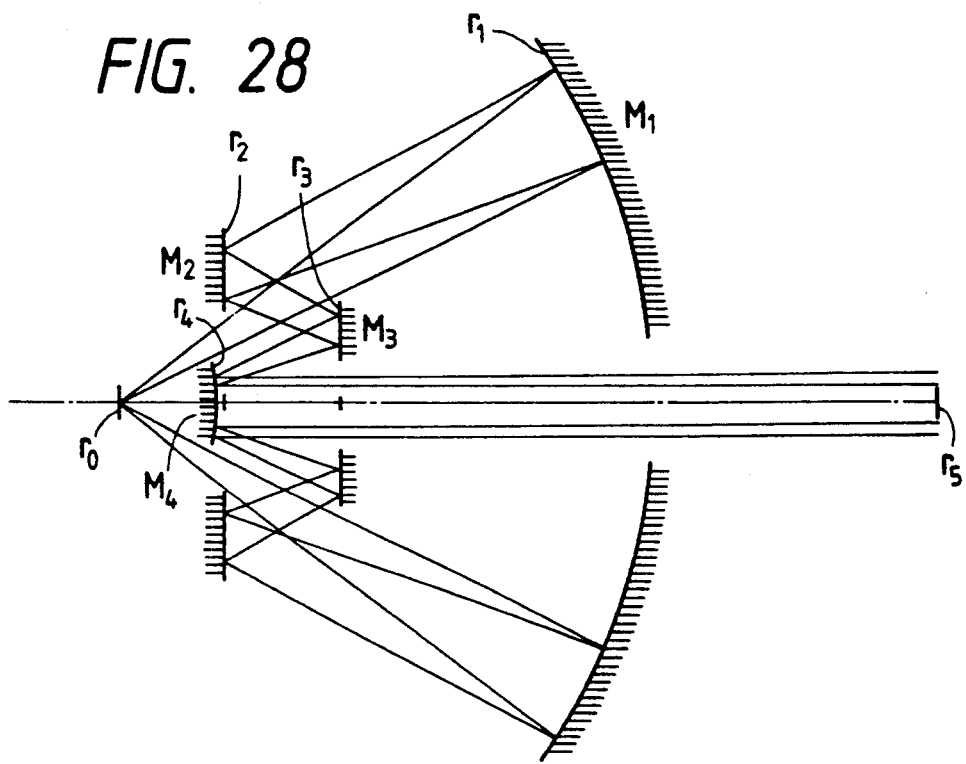
Figure 29:
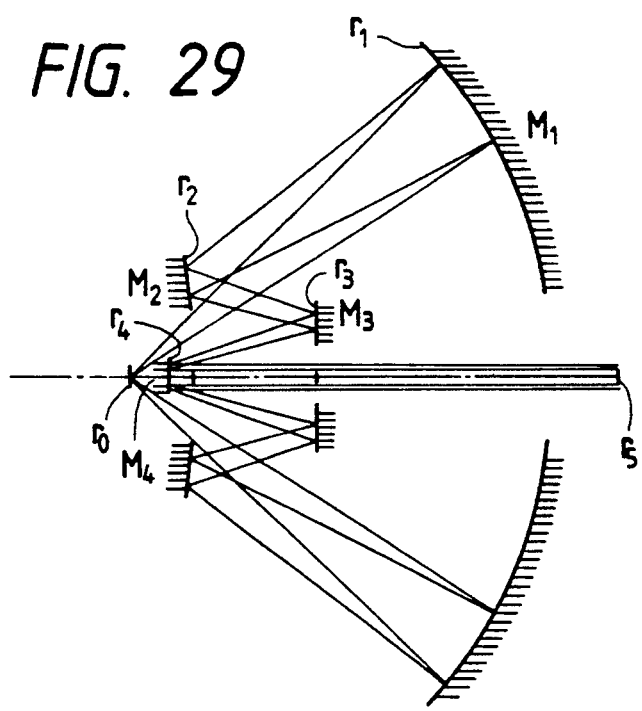
Figure 30:
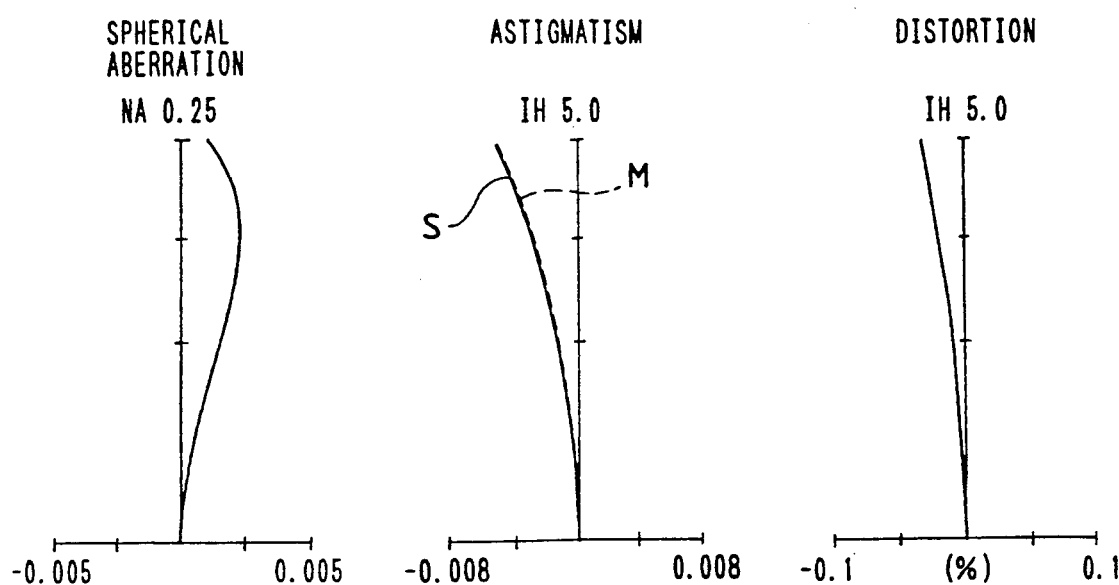
FIG. 30 through FIG. 53 show curves illustrating aberration characteristics of the Embodiments 1 through 24 respectively of the reflecting objective system according to the present invention.
Figure 31:
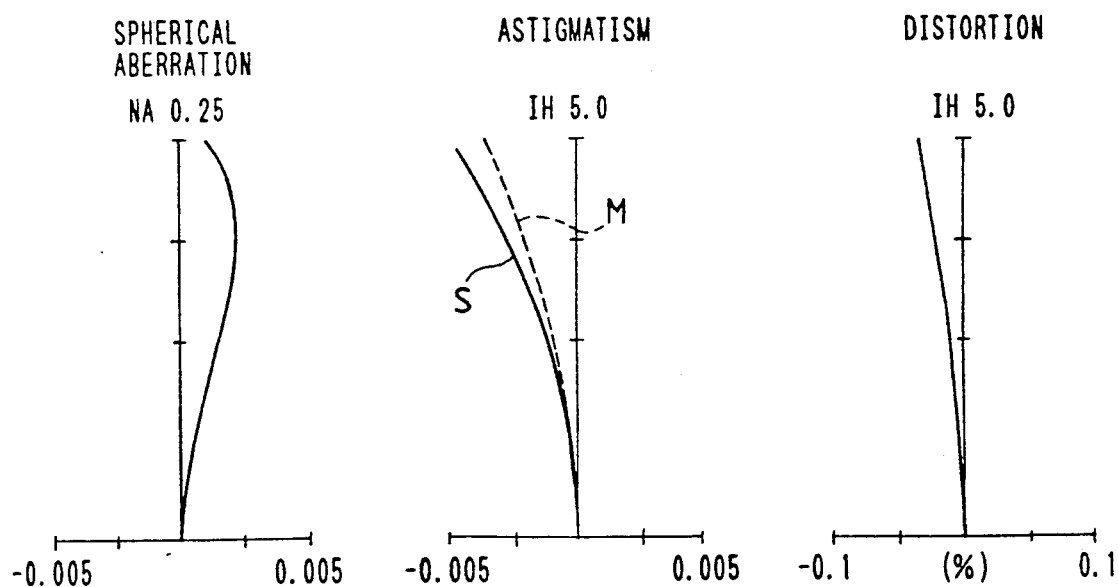
Figure 32:
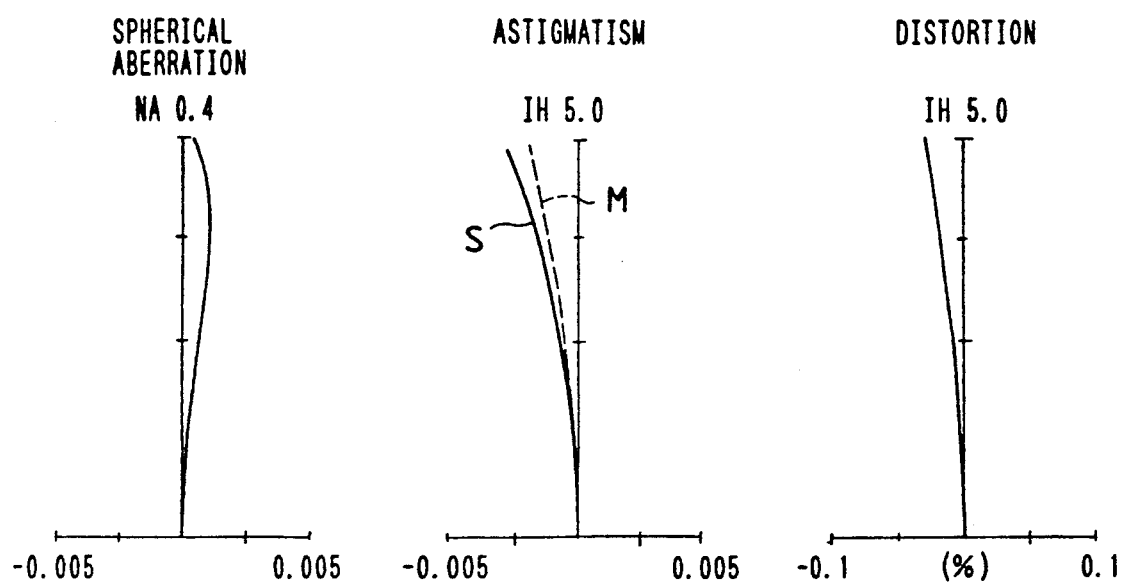
Figure 33:
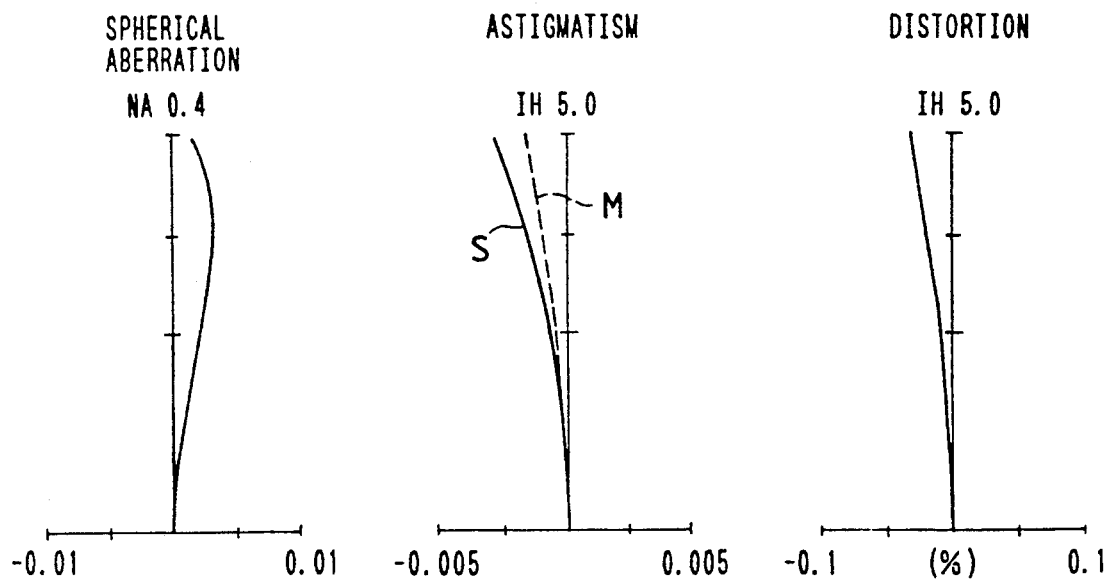
Figure 34:
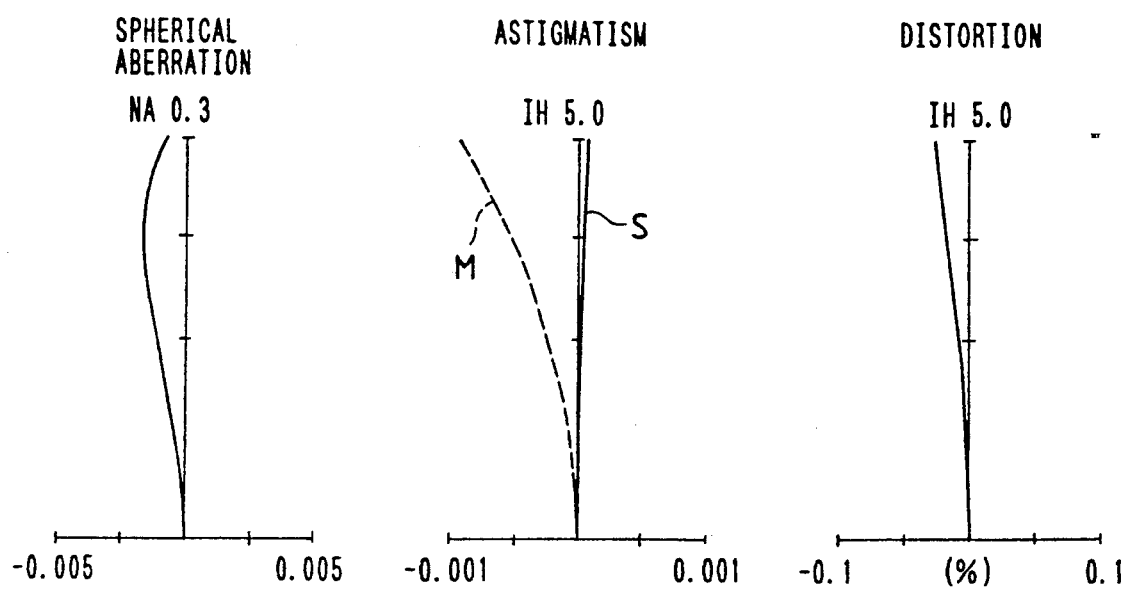
Figure 35:
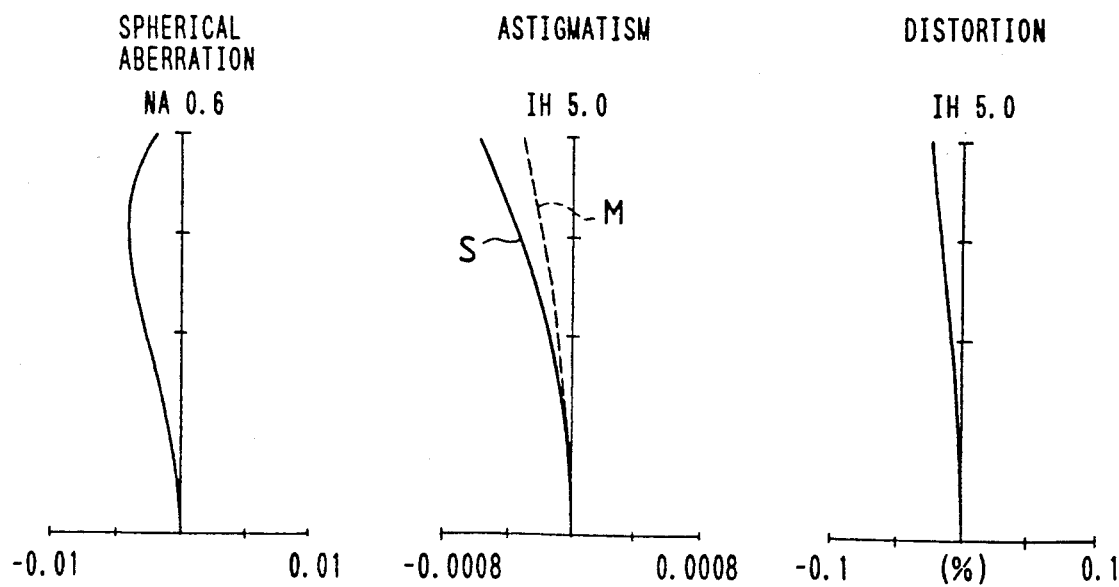
Figure 36:
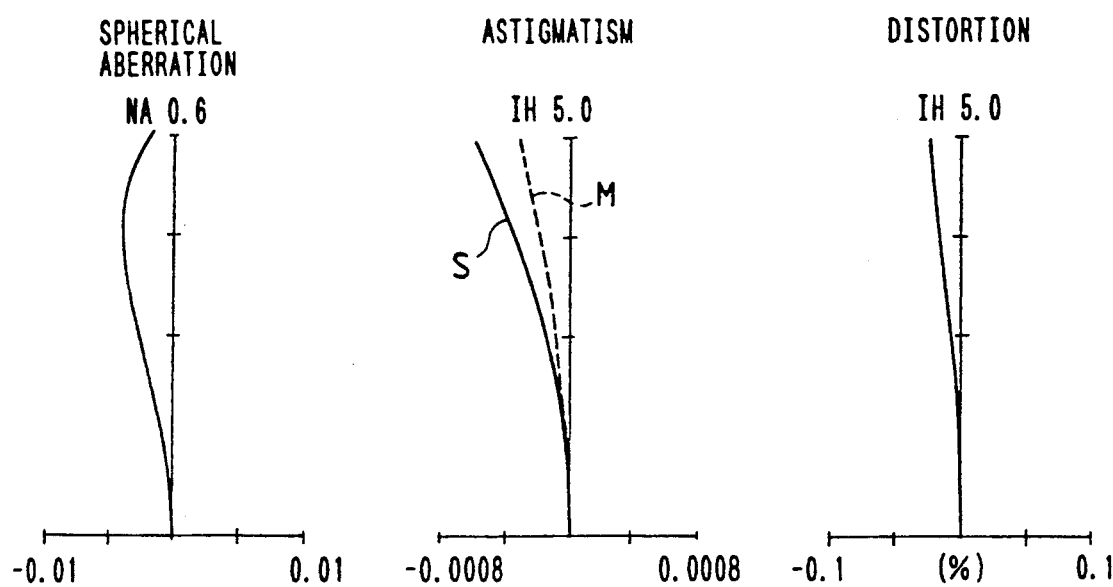
Figure 37:
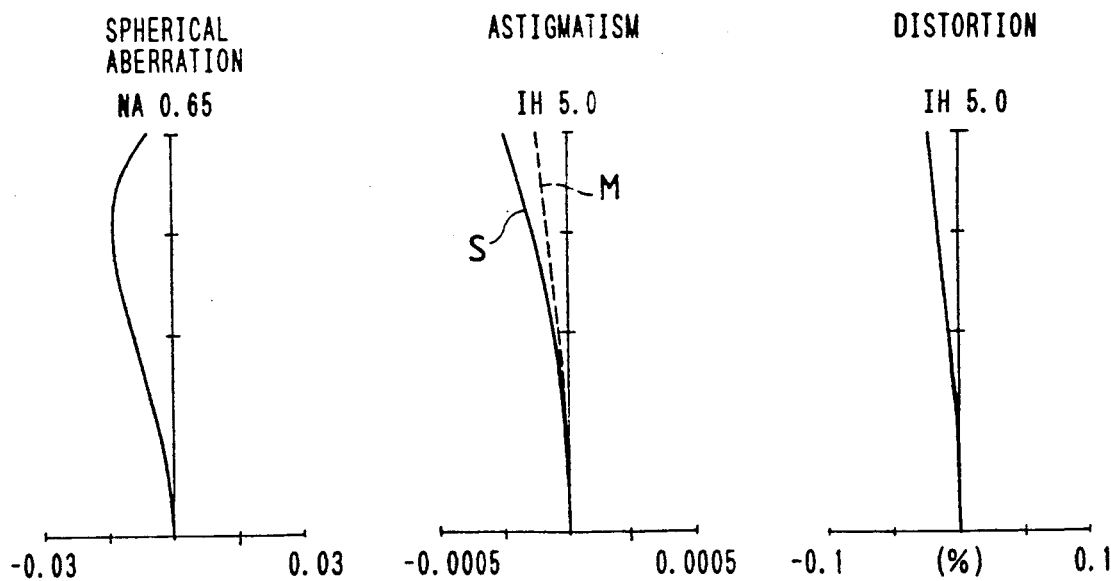
Figure 38:
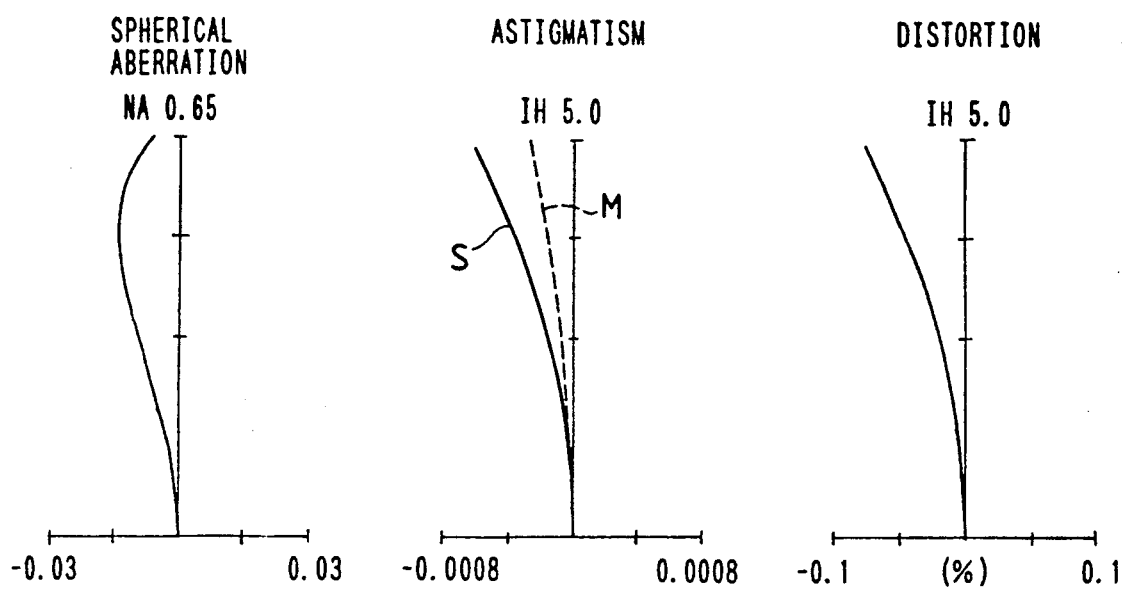
Figure 39:
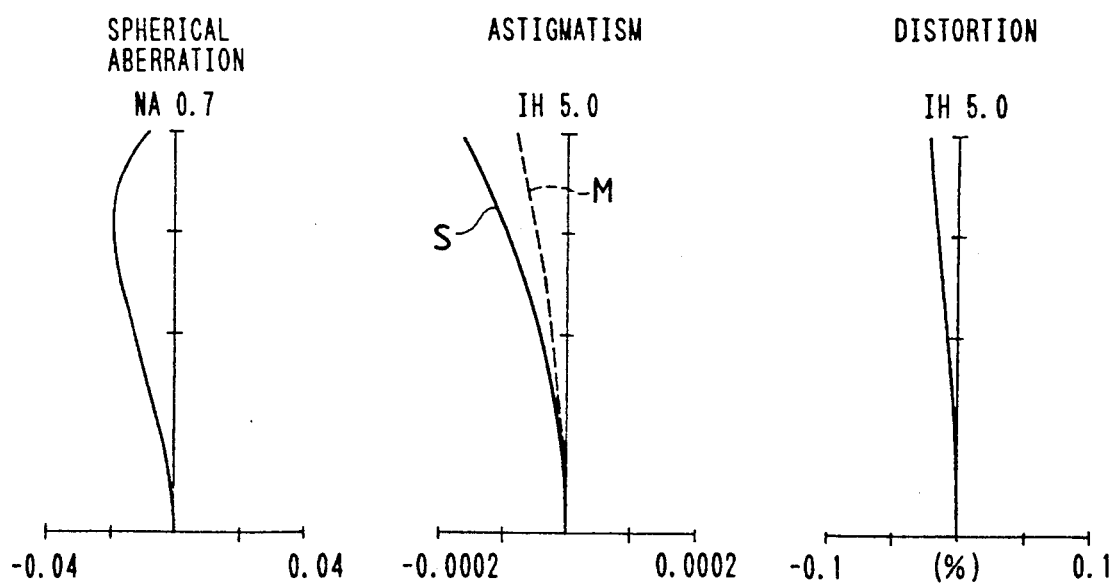
Figure 40:
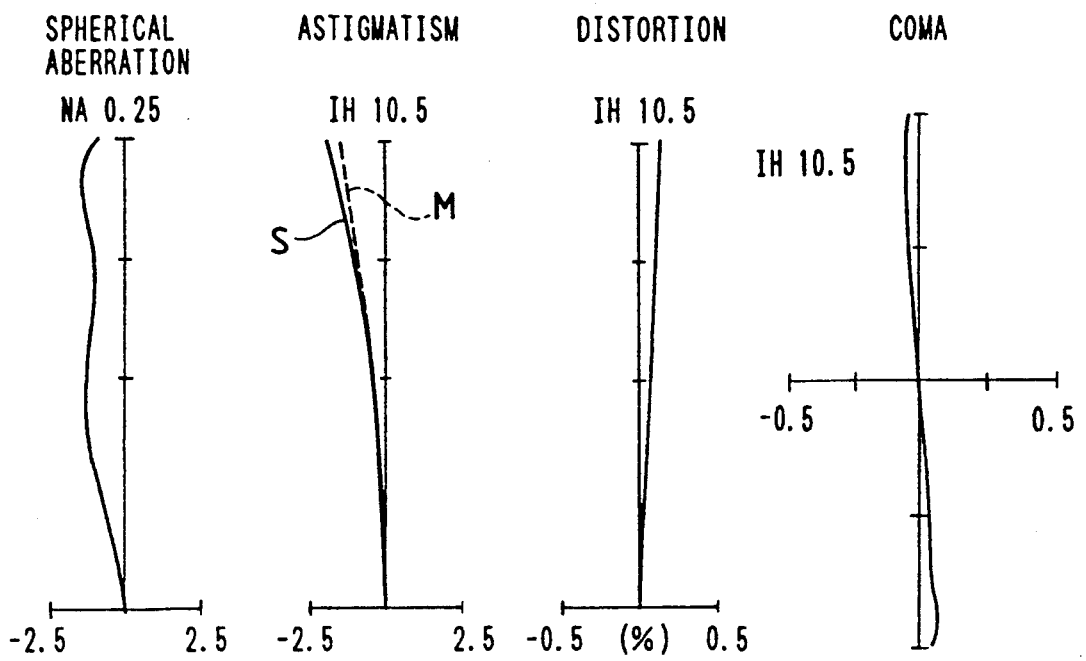
Figure 41:
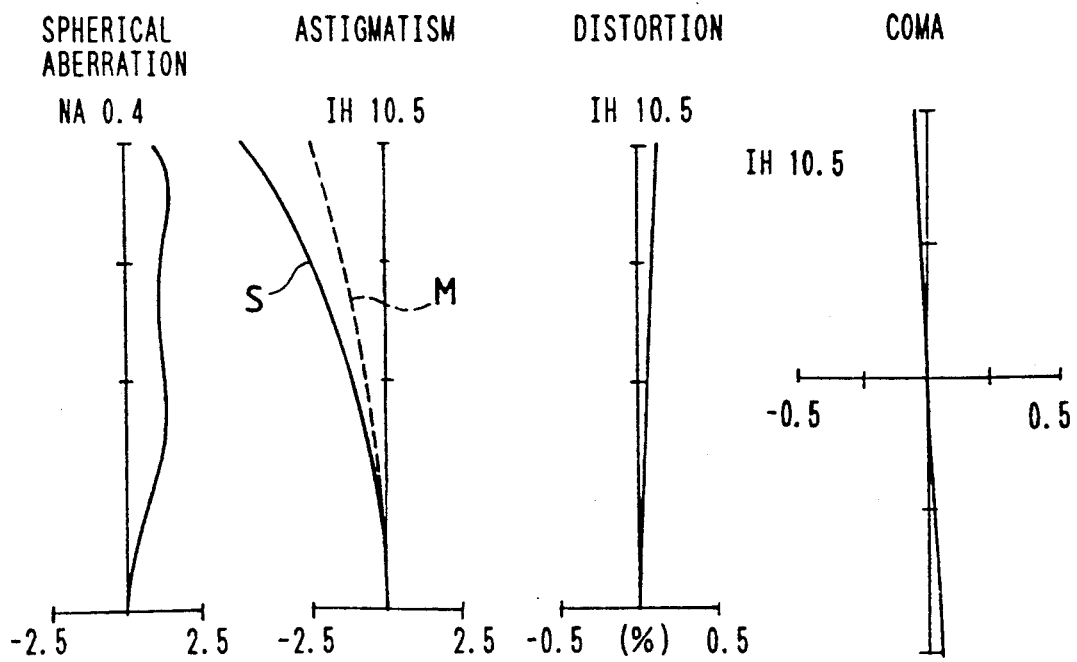
Figure 42:
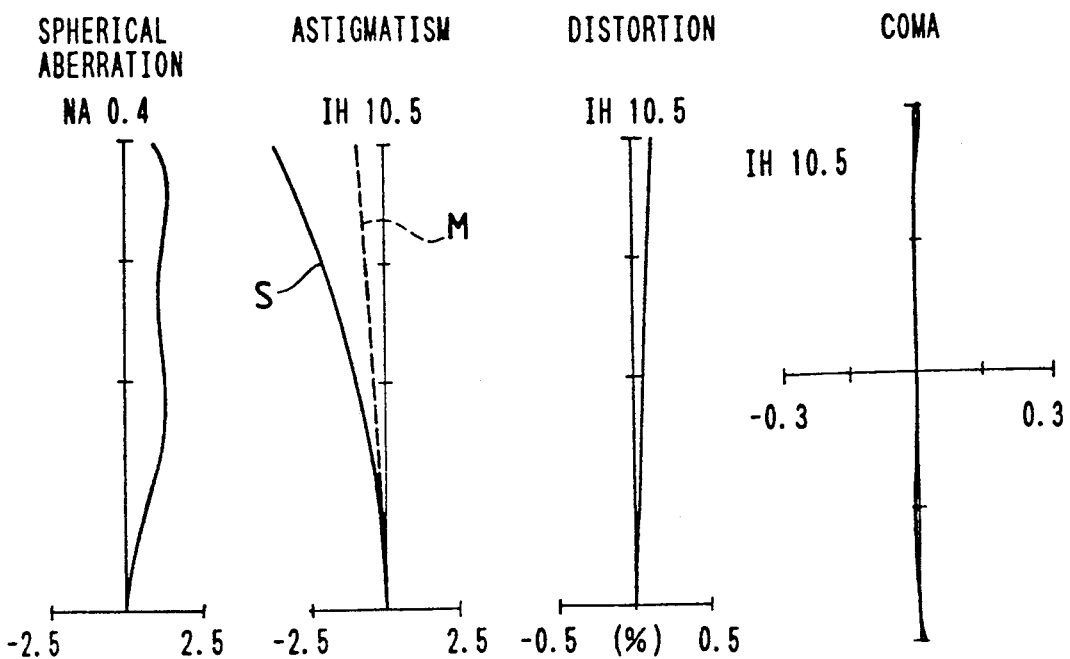
Figure 43:
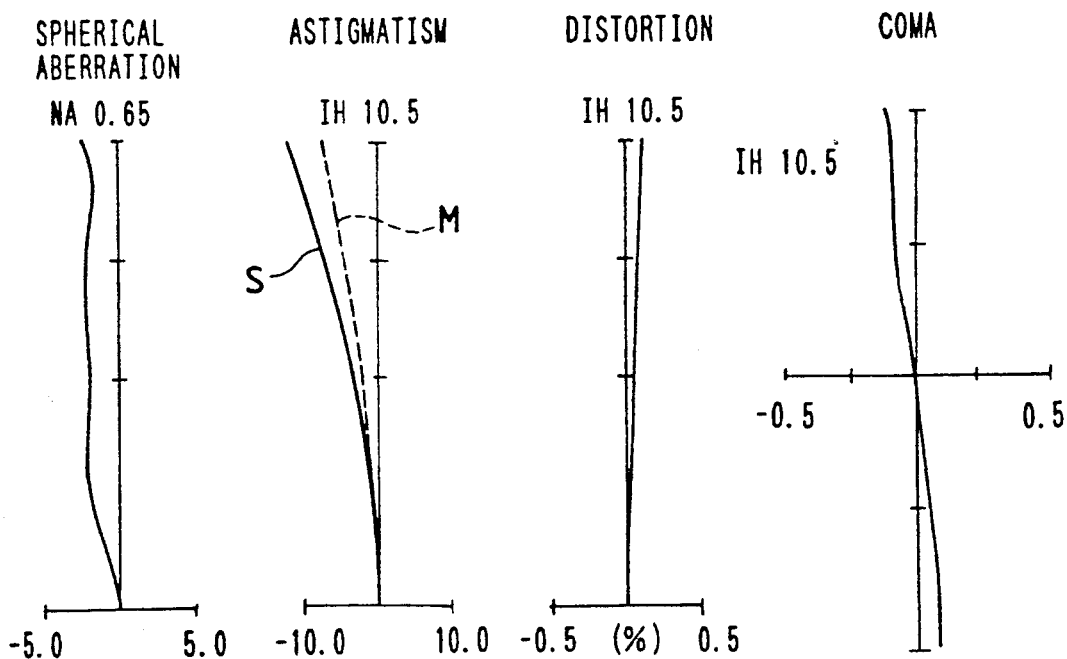
Figure 44:
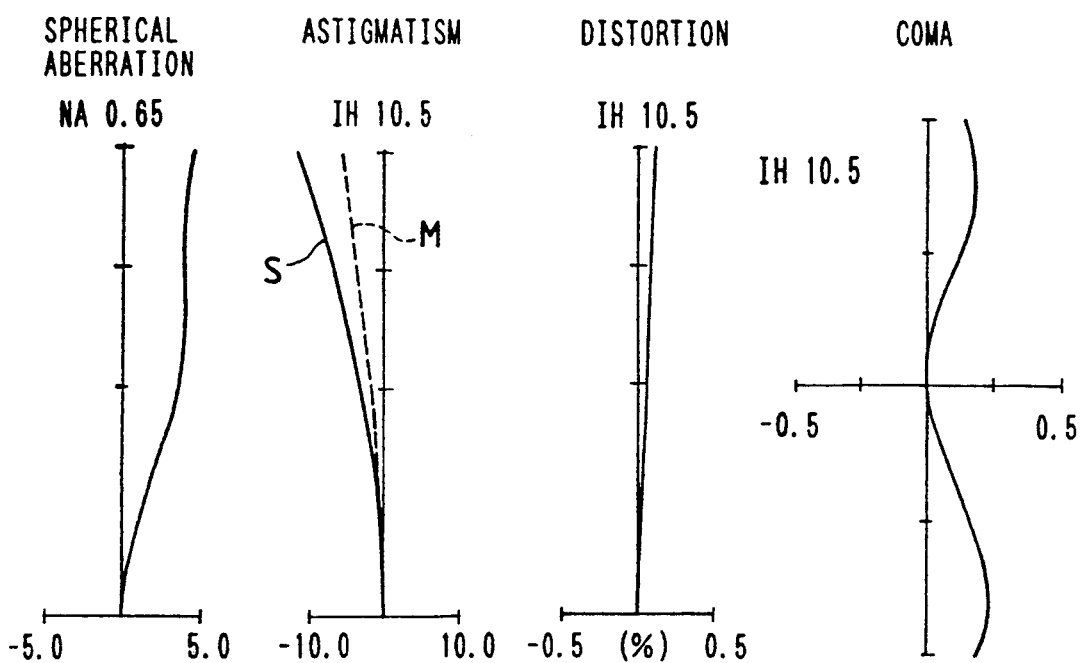
Figure 45:
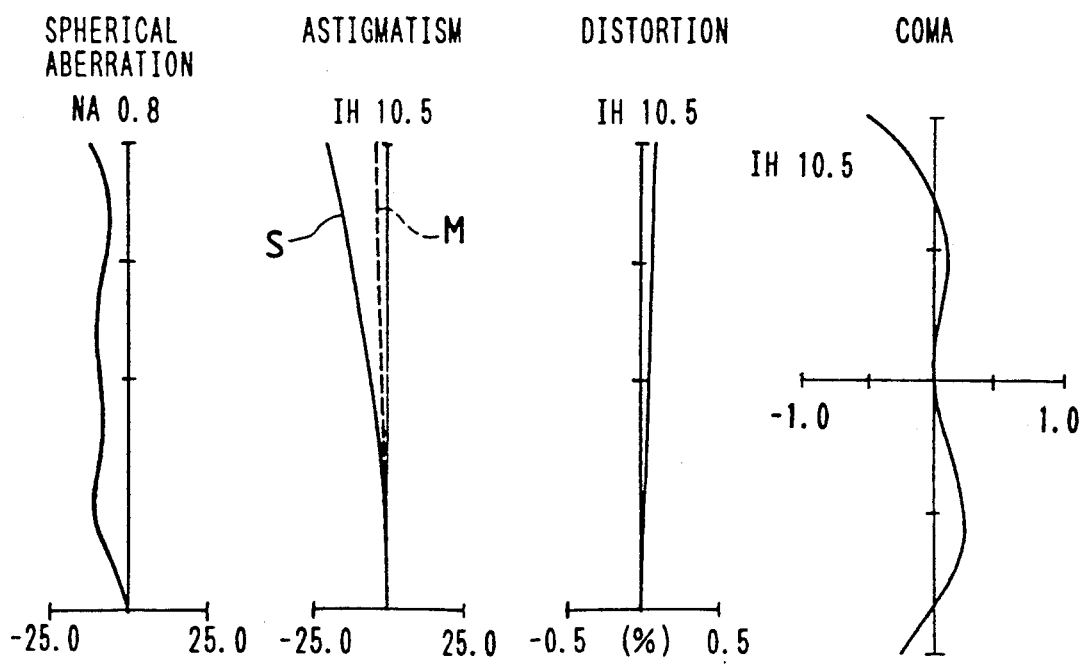
Figure 46:
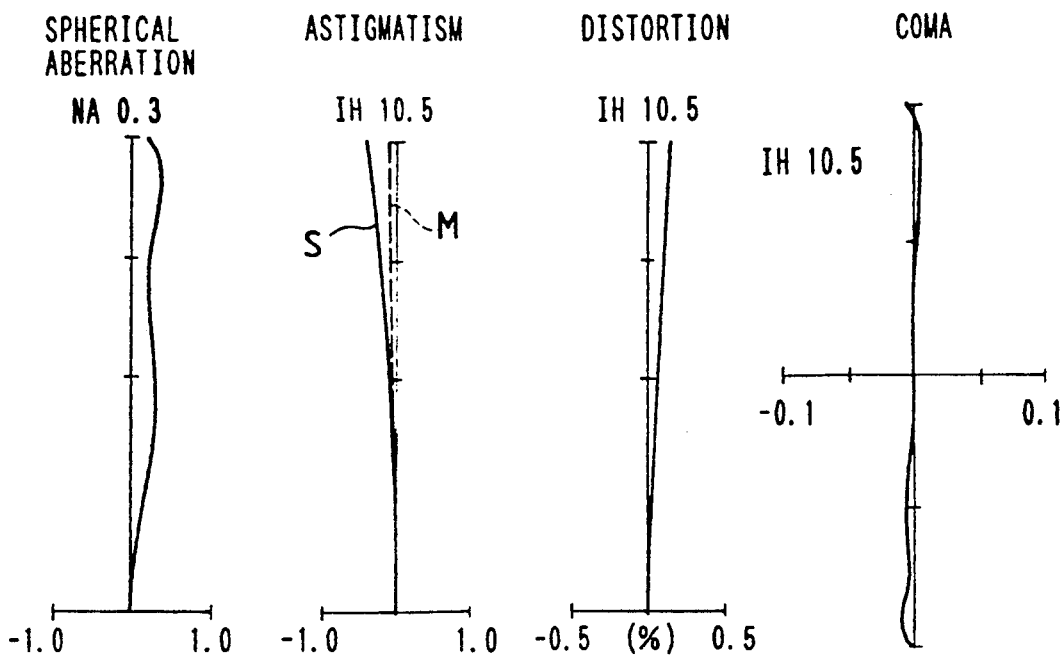
Figure 47:
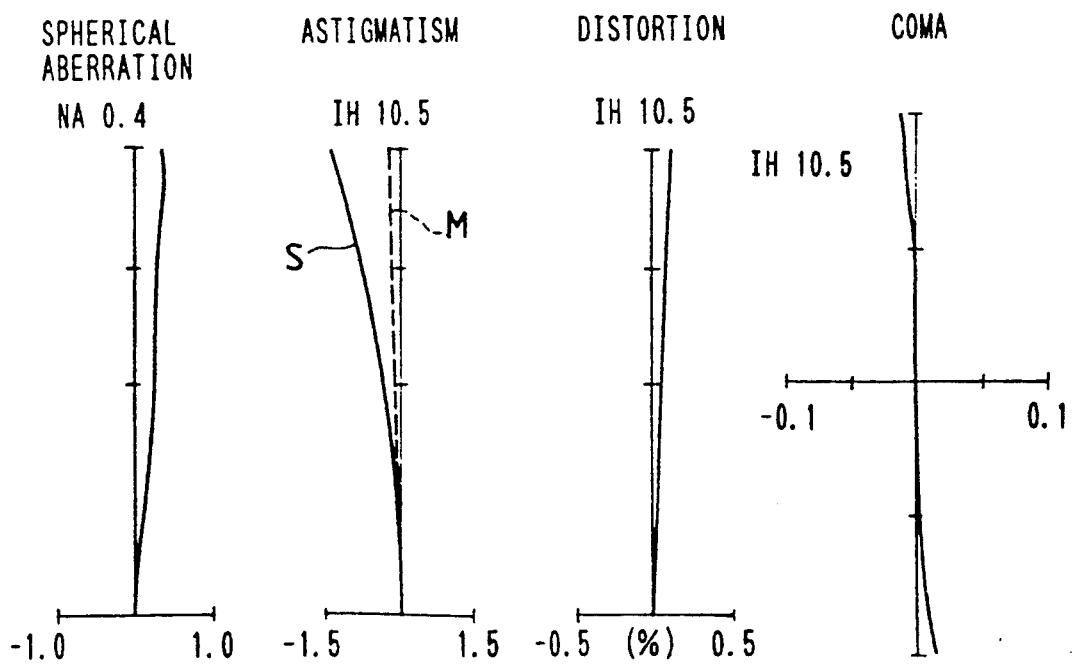
Figure 48:
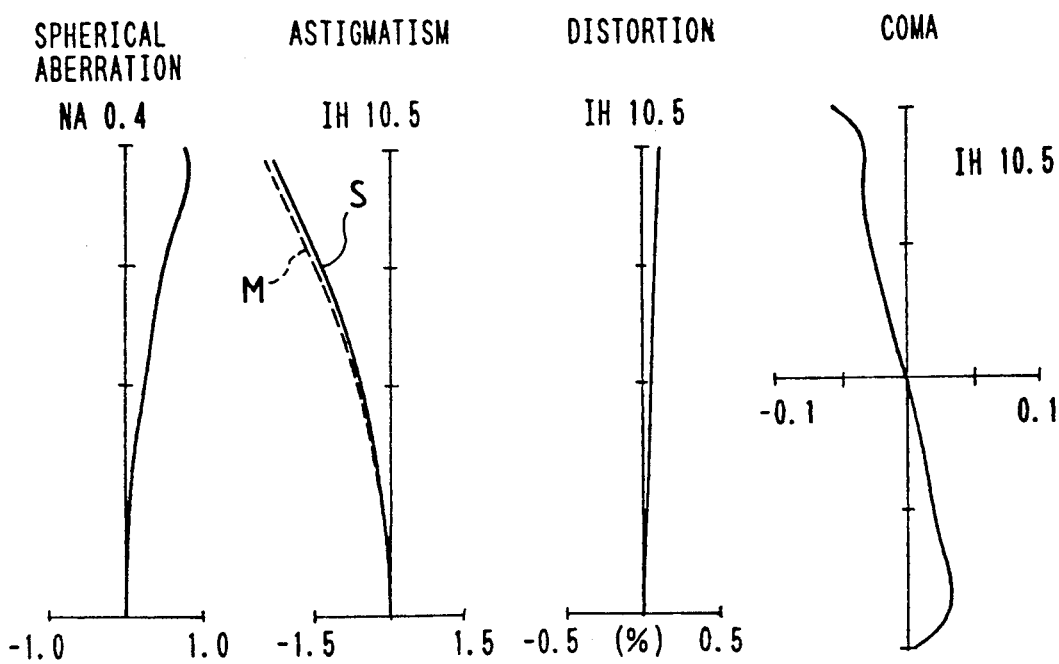
Figure 49:
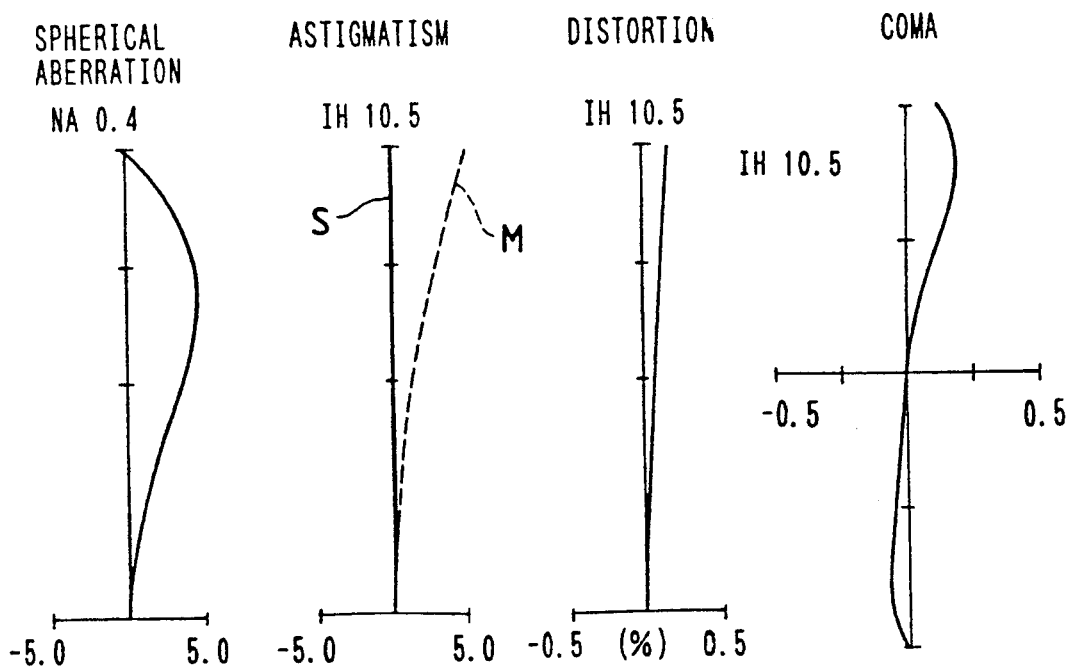
Figure 50:
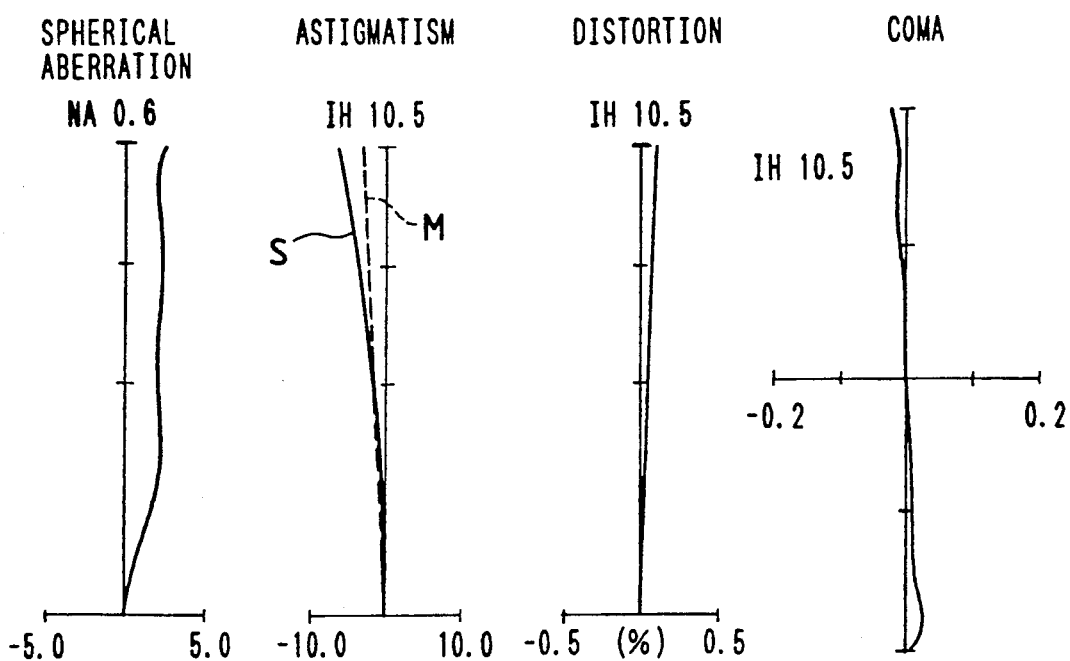
Figure 51:
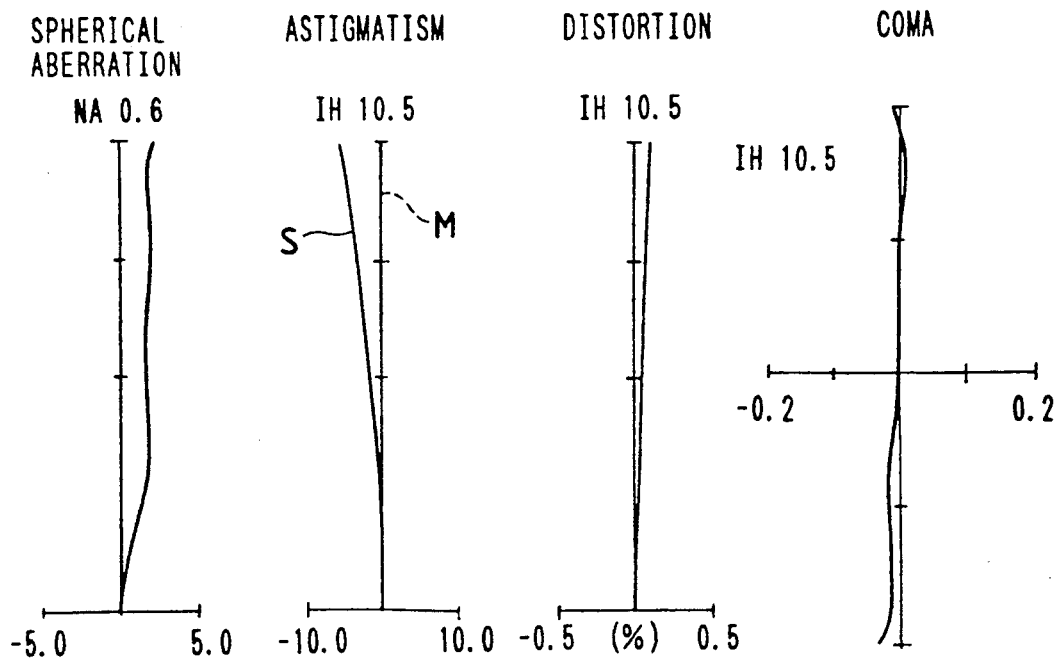
Figure 52:
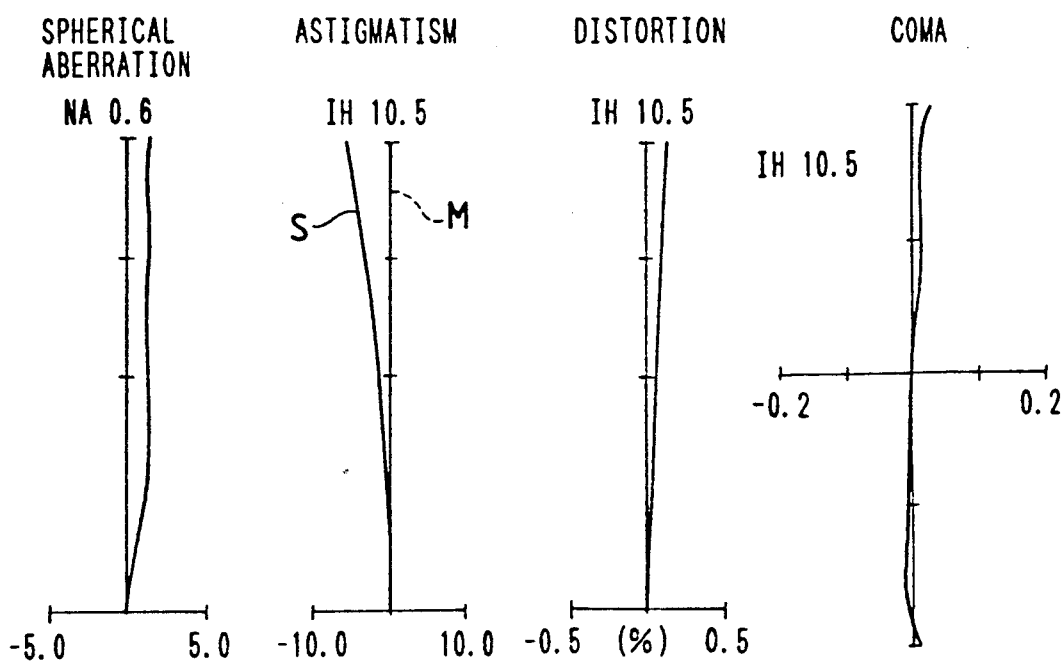
Figure 53:
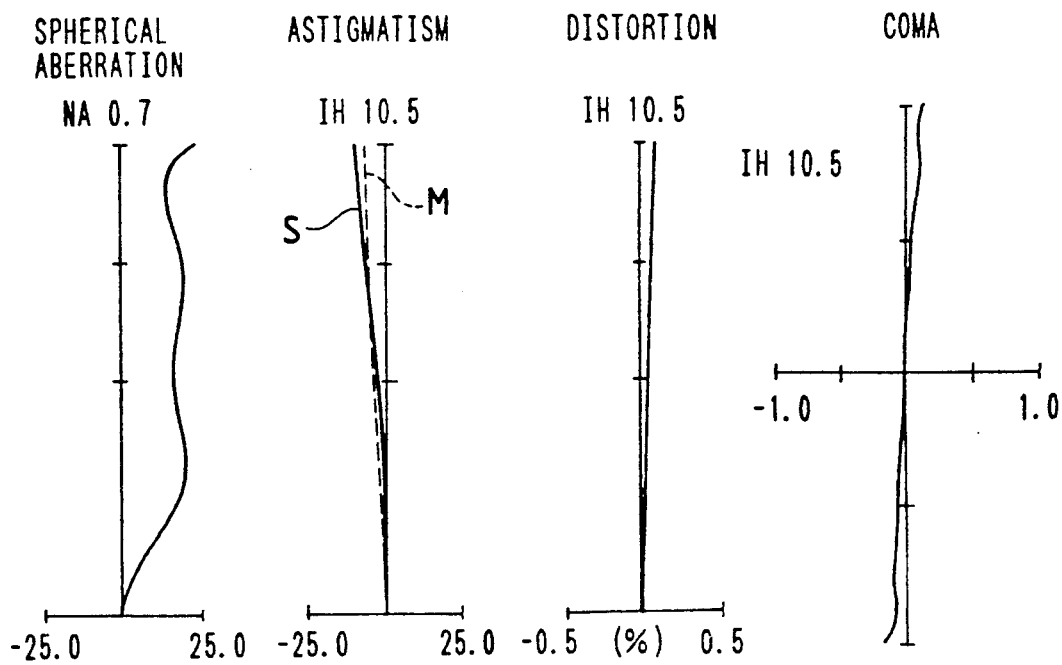
Figure 54:
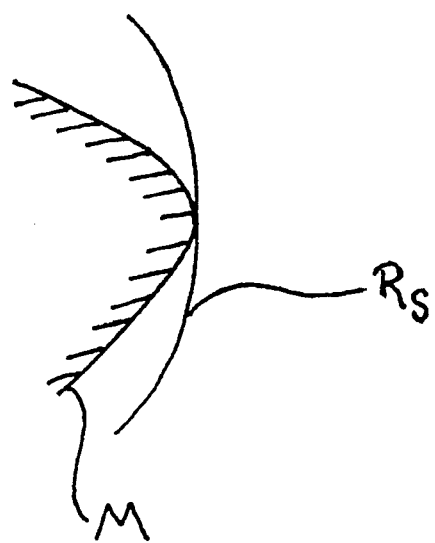
FIG. 54 illustrates a sectional view of the shape of the aspherical surface of the second reflecting mirror of the reflecting objective system according to the present invention, wherein a higher than normal curvature is imparted to the second reflecting mirror.

Each of the Embodiments 11 through 13 is designed as a reflecting objective system wherein the reflecting mirrors $M_2$ and $M_3$ shown in the drawing (FIG. 16, FIG. 17 or FIG. 18) are used as the first reflecting mirror and the second reflecting mirror respectively, and the reflecting mirror $M_1$ is adopted for turning back the light. In each of the Embodiments 11 through 16, both the first reflecting mirror and the second reflecting mirror have aspherical surfaces. The Embodiment 17 comprises aspherical surfaces on the second reflecting mirror and the third reflecting mirror, the Embodiment 18 comprises aspherical surfaces on the first reflecting mirror, the second reflecting mirror and the fourth reflecting mirror, the Embodiment 19 comprises aspherical surfaces on the first reflecting mirror and the second reflecting mirror, the Embodiment 20 adopts an aspherical surfaces on the fourth reflecting mirror, the Embodiment 21 uses aspherical surfaces on the first reflecting mirror and the second reflecting mirror, each of the Embodiments 22 and 23 comprises aspherical surfaces on the first reflecting mirror and the third reflecting mirror, and the Embodiment 24 adopts aspherical surfaces on the first reflecting mirror and the second reflecting mirror.

As is understood from the foregoing description, the reflecting objective system according to the present invention has excellent optical performance. In the first and second types of the reflecting objective system according to the present invention, spherical aberration is corrected very favorably by using only the spherical surfaces, whereas in the third and fourth types, not only spherical aberration but also the offaxial aberrations are corrected very favorably by using the aspherical surfaces.

I claim:

1. A reflecting objective system that excludes a refracting optical element and receives light from an object separate from the system with a given distance therebetween and acts to form an image of the object, comprising, in the travelling order of light incident from the object side:

a first reflecting mirror having a positive optical power, a second reflecting mirror and a third reflecting mirror at least one of which has a positive optical power, and a fourth reflecting mirror having a positive optical power, each reflecting mirror having different reflecting surfaces than the other reflecting mirrors, a light beam from said object being reflected from the mirrors in the order of first, second, third and fourth reflecting mirrors without the beam intersecting an optical axis of the system, wherein total optical power of said first, second and third reflecting mirrors has a positive value, and at least one of the reflecting surfaces of said first reflecting mirror and said fourth reflecting mirror being as aspherical surface, an absolute value of powers of said second and third reflecting mirrors being smaller than an absolute value of powers of said first and fourth reflecting mirrors, said third reflecting mirror being disposed between said first reflecting mirror and said second reflecting mirror, and said reflecting objective system satisfying the condition (12):

$$0.01 \leq |\Delta M_{13}| \cdot (f/L_{01}^2) \leq 0.1 \quad (12)$$

wherein the reference symbol $\Delta M_{13}$ represents a mechanical distance between said first reflecting mirror and said third reflecting mirror, f is the focal length of the reflecting objective system, and the reference symbol $L_{01}$ represents a distance between said object and said first reflecting mirror.

2. A reflecting objective system according to claim 1, wherein said reflecting objective system satisfies the following condition (11):

$$|\phi_4| \leq 0.1 \quad (11)$$

wherein $\phi_4 = f \cdot (2/r_4)$, where $r_4$ designates the radius of curvature of the fourth reflecting mirror.

3. A reflecting objective system according to claim 1, wherein said first reflecting mirror includes an opening on the optical axis, and said fourth reflecting mirror is disposed at a position where said optical axis is shielded by said fourth reflecting mirror.

* * * * *